(12) United States Patent
Tsukada et al.

(10) Patent No.: US 8,297,423 B2
(45) Date of Patent: Oct. 30, 2012

(54) TWIN CLUTCH APPARATUS

(75) Inventors: Yoshiaki Tsukada, Saitama (JP); Tomoo Shiozaki, Sakado (JP); Atsushi Ogasawara, Kawagoe (JP)

(73) Assignee: Honda Motor Co., Ltd., Tokyo (JP)

( * ) Notice: Subject to any disclaimer, the term of this patent is extended or adjusted under 35 U.S.C. 154(b) by 831 days.

(21) Appl. No.: 12/442,920

(22) PCT Filed: Sep. 27, 2007

(86) PCT No.: PCT/JP2007/068834
§ 371 (c)(1),
(2), (4) Date: Mar. 25, 2009

(87) PCT Pub. No.: WO2008/041606
PCT Pub. Date: Apr. 10, 2008

(65) Prior Publication Data
US 2010/0072018 A1  Mar. 25, 2010

(30) Foreign Application Priority Data
Sep. 29, 2006  (JP) ................................ P2006-270101

(51) Int. Cl.
*F16D 13/52* (2006.01)
*F16D 25/0638* (2006.01)
(52) U.S. Cl. .................... 192/48.611; 192/55.3; 192/209
(58) Field of Classification Search ............. 192/48.609, 192/48.618, 55.3, 209
See application file for complete search history.

(56) References Cited

U.S. PATENT DOCUMENTS

| | | | |
|---|---|---|---|
| 4,732,253 A | 3/1988 | Hiramatsu et al. | |
| 6,464,059 B1 | 10/2002 | Kundermann et al. | |
| 6,523,657 B1 * | 2/2003 | Kundermann et al. | 192/48.8 |
| 2004/0206599 A1 * | 10/2004 | Hegerath | 192/87.11 |

FOREIGN PATENT DOCUMENTS

| | | |
|---|---|---|
| DE | 4415664 A1 | 11/1995 |
| EP | 1 195 537 A1 | 4/2002 |
| EP | 1 403 544 A2 | 3/2004 |
| EP | 1 803 958 A2 | 7/2007 |
| JP | 7-127657 A | 5/1995 |
| JP | 2001-124110 A | 5/2001 |
| JP | 2001-140936 A | 5/2001 |
| JP | 2001-301478 A | 10/2001 |
| JP | 2004-116723 A | 4/2004 |
| JP | 2005-241000 A | 9/2005 |
| JP | 2005-249080 A | 9/2005 |
| JP | 2007-298064 A | 11/2007 |
| JP | 2009-168041 A | 7/2009 |

* cited by examiner

*Primary Examiner* — Rodney Bonck
(74) *Attorney, Agent, or Firm* — Birch, Stewart, Kolasch & Birch, LLP

(57) ABSTRACT

This twin-clutch apparatus for use in a transmission of an engine, including: a hydraulic first disk clutch and second disk clutch that exert a predetermined engagement force by pressure members displaced in an axial direction by the pressure of a supply oil from outside, the first disk clutch and the second disk clutch being coaxially arranged adjacent to each other, in which: clutch plates of the first disk clutch and clutch plates of the second disk clutch are different in thickness from each other.

12 Claims, 19 Drawing Sheets

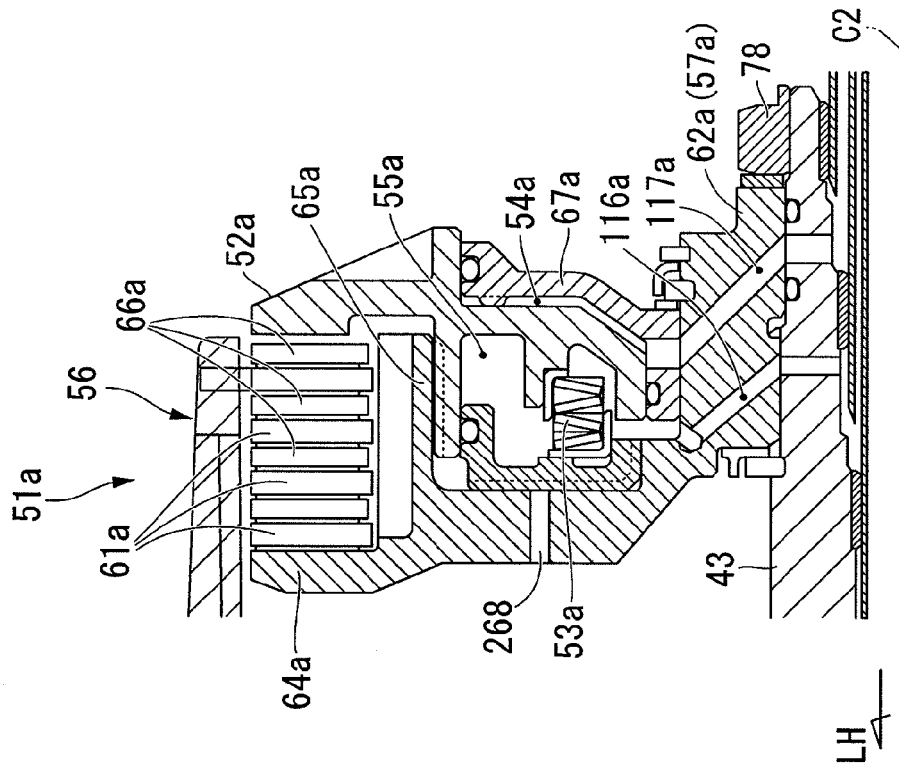
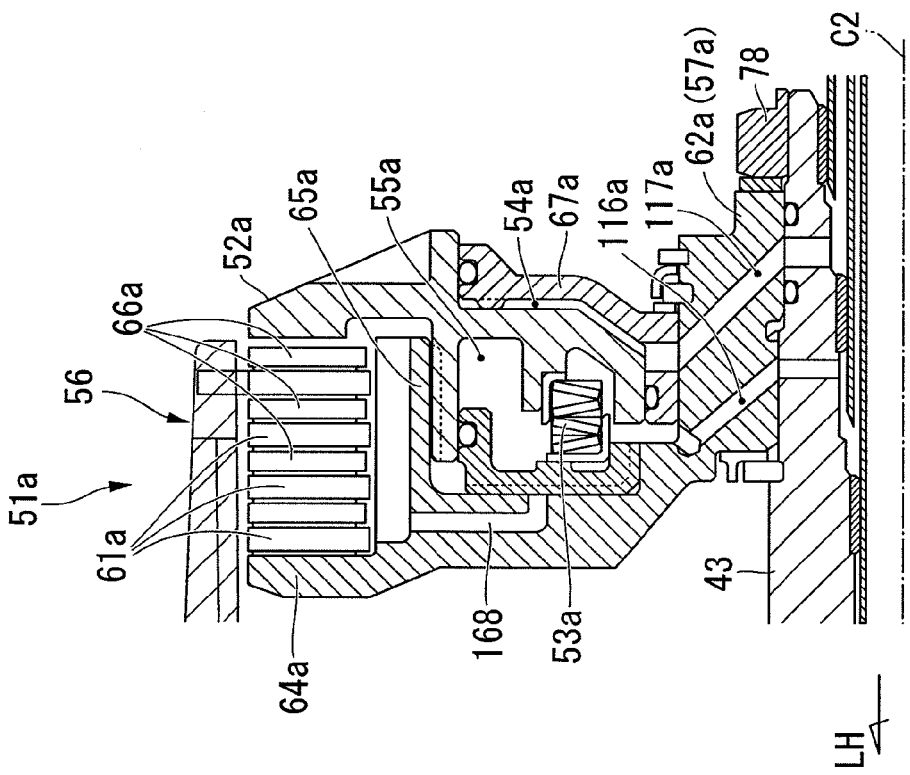

| REGION NAME | FIRST SWITCH | SECOND SWITCH |
|---|---|---|
| HALT | ON | ON |
| CCW MODIFICATION | OFF | ON |
| FEED | OFF | OFF |
| CW MODIFICATION | ON | OFF |

| REGION NAME | MOTOR TORQUE |
|---|---|
| HALT | 0 |
| CCW MODIFICATION | −Tmin |
| FEED | ±Tmax |
| CW MODIFICATION | +Tmin |

# TWIN CLUTCH APPARATUS

TECHNICAL FIELD

The present invention relates to a twin-clutch apparatus for use in a transmission of a motor vehicle or the like.

Priority is claimed on Japanese Patent Application No. 2006-270101, the contents of which are incorporated herein by reference.

BACKGROUND ART OF THE INVENTION

Conventional twin-clutch apparatuses have a hydraulic first disk clutch and a hydraulic second disk clutch arranged coaxially, the clutches exerting a predetermined engaging force by pressure members displaced by the pressure of an oil supplied from the outside. The twin-clutch apparatuses are used for reducing slippage while driving in a semi-automatic transmission mode and for reducing a transmission shock at the time of start through appropriately switching between the first disk clutch and the second disk clutch.

Here, the first disk clutch and the second disk clutch play a different role. Therefore, they may have a different requirement in clutch capacity. For example, in Patent Document 1, a first clutch plate and a second clutch plate have a difference in diameter, to thereby bring about a difference in clutch capacity.

Patent Document 1: Japanese Unexamined Patent Publication, First Publication

DETAILED DESCRIPTION OF THE INVENTION

Problems to be Solved by the Invention

In the above case, it is required to make an outer diameter of one of the clutch plates larger than that of the other. As a result, the clutch as a whole is likely to have a large outer diameter.

In the case of a small motor vehicle such as a two-wheeled motor vehicle, this poses a problem in that the clutch apparatus needs to be compactly contained in an engine so as to suppress increases in the size of an engine.

Furthermore, for example, in the case of using the clutch apparatus in a structure where an odd numbered gear of a transmission is coupled to one of the disk clutches and an even numbered gear of the transmission is coupled to the other, and also one of the disk clutches is disconnected and the other is connected by switching the transmission gears of the transmission, it is desirable that modification of the capacity of the first disk clutch and the second disk clutch can be made with ease without changing the basic structure of the engine.

Therefore, it is an object of the present invention to provide a twin-clutch apparatus for use in a transmission of a motor vehicle or the like, in which the clutch capacity is easily optimized while the clutch as a whole remains compact.

Means for Solving the Problem

In order to solve the above problems, the present invention employs the following:

(1) That is, a twin-clutch apparatus of the present invention is a twin-clutch apparatus for use in a transmission of an engine, including: a hydraulic first disk clutch and second disk clutch that exert a predetermined engagement force by pressure members displaced in an axial direction by the pressure of a supply oil from outside, the first disk clutch and the second disk clutch being coaxially arranged adjacent to each other, in which: clutch plates of the first disk clutch and clutch plates of the second disk clutch are different in thickness from each other.

(2) A configuration may be adopted in which, of the first disk clutch and the second disk clutch, one with relatively thicker clutch plates is coupled to a first speed gear of the transmission.

(3) A configuration may be adopted in which, of the first disk clutch and the second disk clutch, one with relatively thicker clutch plates is arranged in a vicinity of an outer wall of a clutch case.

(4) A configuration may be adopted in which, on a clutch center of at least one of the first disk clutch and the second disk clutch, there is provided a shock absorber member for absorbing a shock at the time of a force transfer.

Advantageous Effects of the Invention

According to the invention set forth in above (1), while the clutch plates of the disk clutches are made equal in diameter, it is possible to make the clutch capacities different, and to maintain the whole clutch compact. Furthermore, only a modification of the clutch plate thicknesses allows for easy optimization of the clutch capacity.

According to the above (2), it is possible to secure the capacity of the disk clutch, to which the first gear requiring a heavier load at the start or the like is coupled, more than that of the other disk clutch. Therefore, it is possible to actualize a transmission that is compact and favorable in efficiency.

According to the above (3), it is possible to arrange the disk clutch that produces much heat after being coupled to the first gear near an outer wall of a clutch case, that is, at a position that is likely to dissipate heat.

According to the above (4), it is possible to absorb a shock at the time of a connection/disconnection operation of the disk clutches, thus allowing for a smooth transmission operation.

BRIEF DESCRIPTION OF THE DRAWINGS

FIG. 7A is a cross-sectional view corresponding to a part of FIG. 6. It shows a first modification of an oil supply passage to a clutch disk of the twin clutch.

FIG. 7B is a cross-sectional view corresponding to a part of FIG. 6. It shows a second modification of the oil supply passage

DESCRIPTION OF THE REFERENCE SYMBOLS

Figure 1:
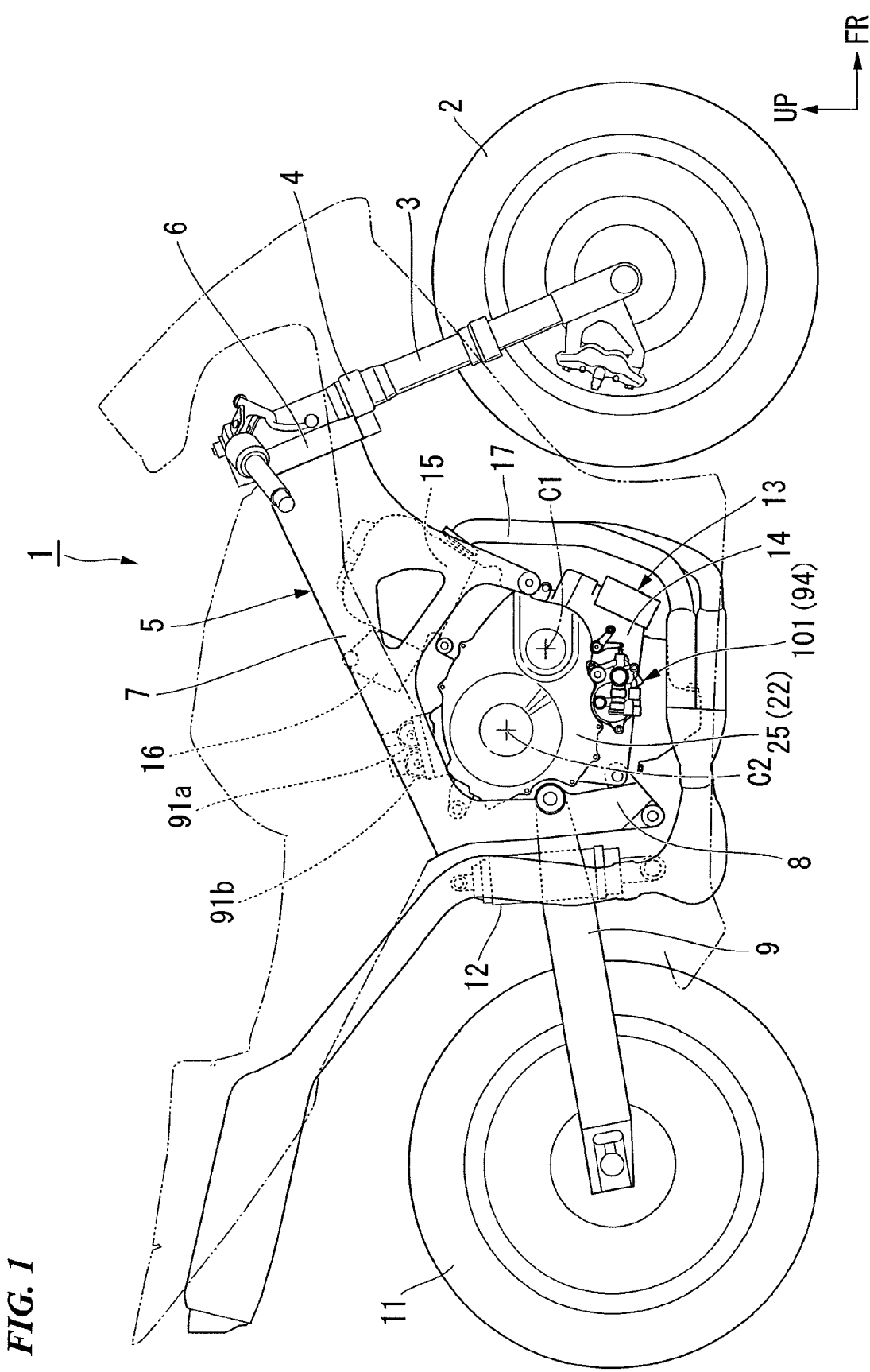
FIG. 1 is a right side view showing a two-wheeled motor vehicle according to an embodiment of the present invention.

1: two-wheeled motor vehicle (saddle mounting type motor vehicle)
13: engine
23: twin-clutch transmission (transmission)
25: clutch case
45a: transmission gear pair (first gear)
51a: first disk clutch
51b: second disk clutch
52a, 52b: pressure plate (pressure member)
57a, 57b: clutch center
59: damper member (shock absorber member)
61a, 61b: clutch plate
69a: right outside wall (outer wall)

BEST MODE FOR CARRYING OUT THE INVENTION

Hereunder is a description of an embodiment of the present invention, with reference to the drawings. Note that the directions of front, rear, left, right, and the like in the following description are the same as those in a motor vehicle, unless otherwise specified. In the figures, an arrow FR, an arrow LH, and an arrow UP denote a front direction, a left direction, and an upper direction of the motor vehicle, respectively.

As shown in FIG. 1, an upper portion of a front fork 3 for axially supported a front wheel 2 of a two-wheeled motor vehicle (saddle mounting type motor vehicle) 1 is pivotally supported in a steerable manner by a head pipe 6 at a front end portion of a vehicle body frame 5 via a steering system 4. From the head pipe 6, a main frame 7 extends in a rear direction and continues into a pivot plate 8. On the pivot plate 8, a front end portion of a swing arm 9 is pivotally supported in a vertically swingable manner. To a rear end portion of the swing arm 9, a rear wheel 11 is axially supported. Between the swing arm 9 and the vehicle body frame 5, a cushion unit 12 is installed. In the vehicle body frame 5, an engine (internal combustion engine) 13, which is a motor of the two-wheeled motor vehicle 1, is mounted.

Figure 2:
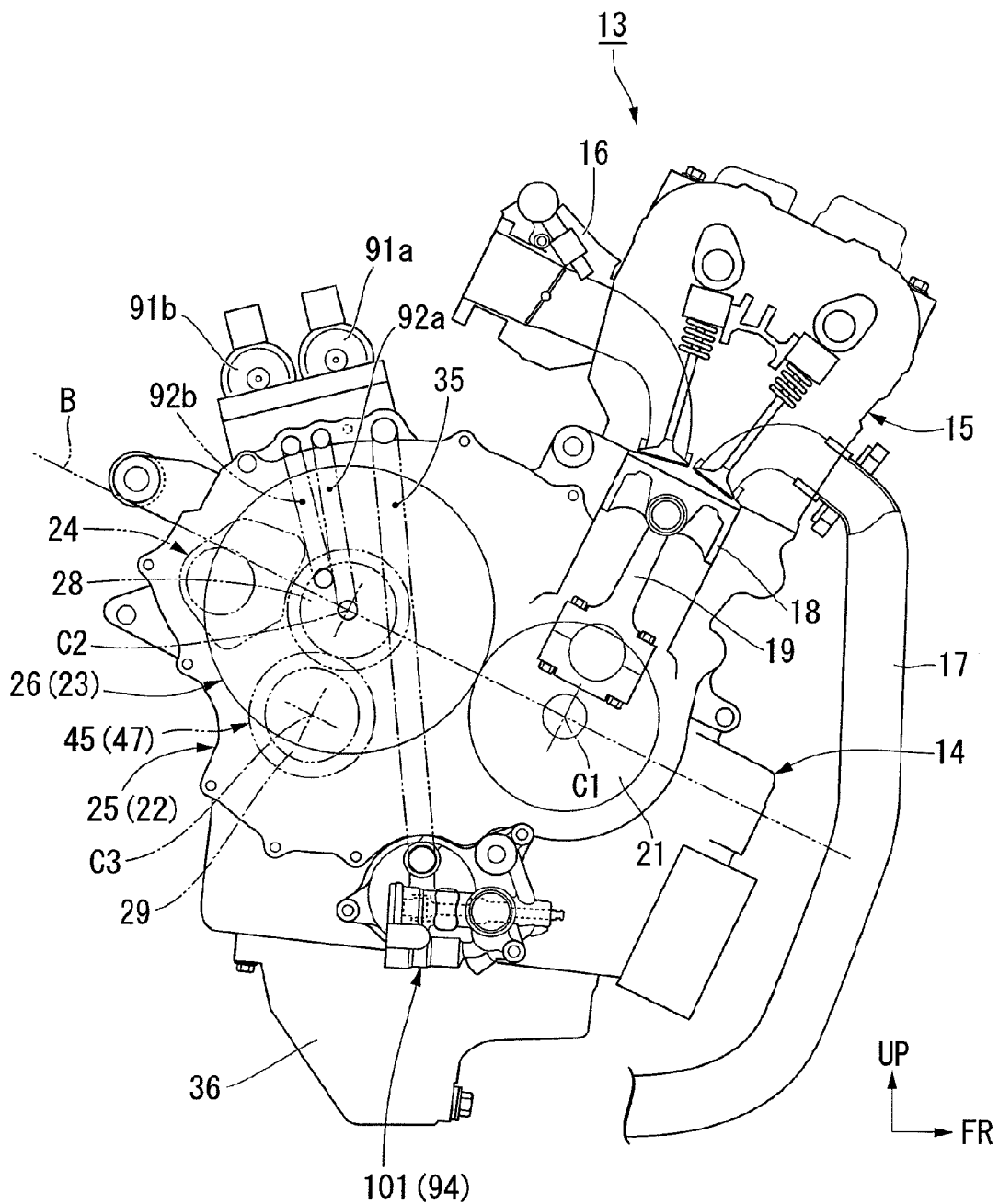
FIG. 2 is a right side view showing an engine of the two-wheeled motor vehicle.

With additional reference to FIG. 2, the engine 13 is an in-line four cylinder engine with a crank axis line C1 oriented along a vehicle width direction (left-right direction). On a crankcase 14 of the engine 13, a cylinder portion 15 is vertically arranged. To a rear portion of the cylinder portion 15, a throttle body 16 of an intake system is connected. To a front portion of the cylinder portion 15, an exhaust pipe 17 is connected. Pistons 18 corresponding to the respective cylinders are reciprocally fit in the cylinder portion 15. Each of the reciprocating movements of these pistons 18 is converted to a rotational movement of a crankshaft 21 via a connecting rod 19.

Figure 3:
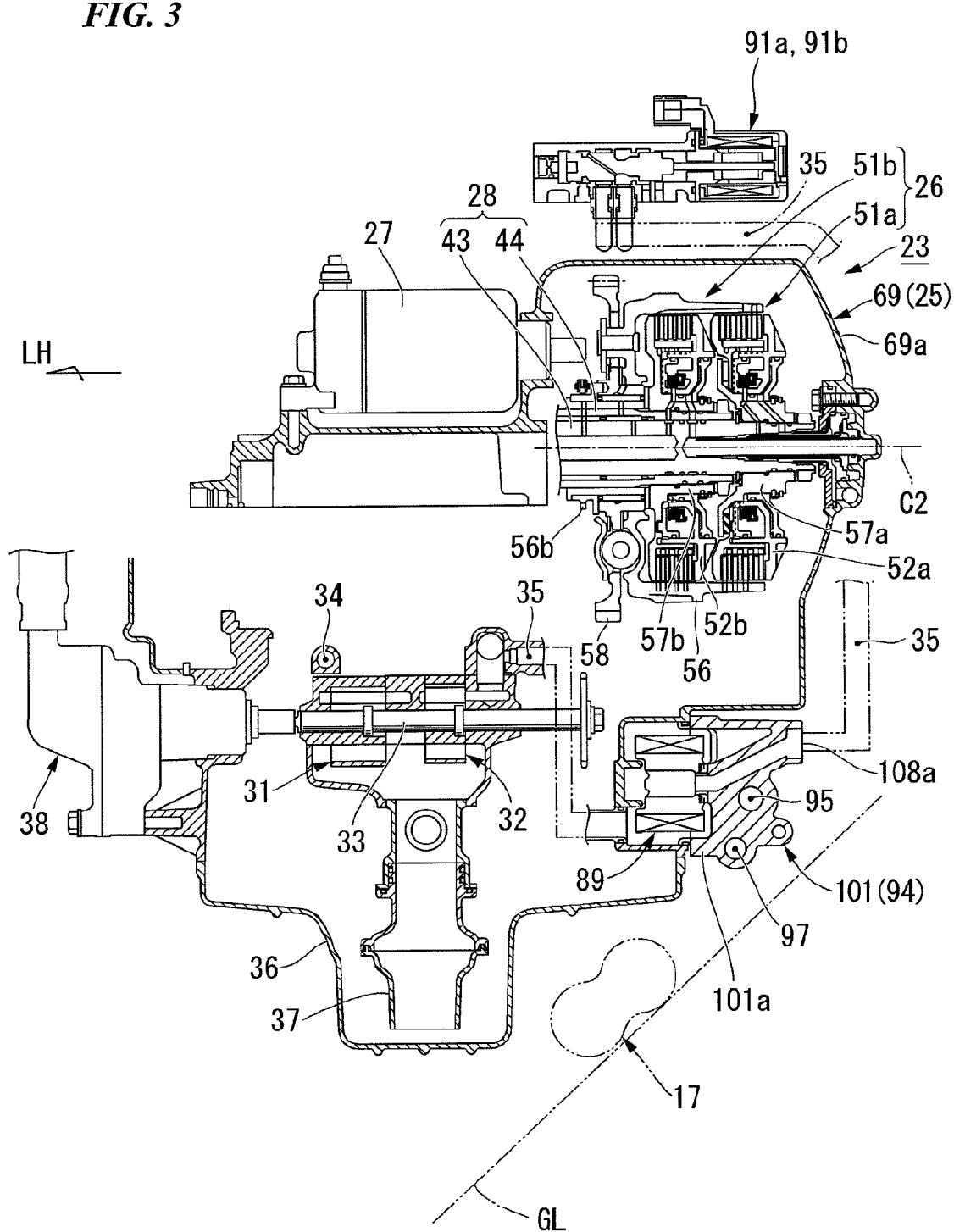
FIG. 3 shows a main part of the engine. It is a cross-sectional view showing the main part cut away in a left-right direction in a parallel manner.

With additional reference to FIG. 3, a transmission case 22 continues integrally into a rear portion of the crankcase 14. In the transmission case 22, the twin-clutch transmission 23 and a change mechanism 24 are contained. A right side portion of the transmission case 22 is used as the clutch case 25. In the clutch case 25, the twin clutch 26 of the twin-clutch transmission 23 is contained. Note that on the transmission case 22, a starter motor 27 is disposed (see FIG. 3). A rotational force of the crankshaft 21, after being output to the left side of the transmission case 22 via the twin-clutch transmission 23, is transferred to the rear wheel 11 via, for example, a force transfer mechanism of a chain type.

As shown in FIG. 2, the engine 13 has three main shafts arranged in a triangle, the three shafts being the crankshaft 21, a main shaft 28 that is parallel to the crankshaft 21 of the twin-clutch transmission 23, and a counter shaft 29. To be more specific, axis lines C1, C2 of the crankshaft 21 and the main shaft 28 are arranged on a rearward-rising upper-lower division plane B of the crankcase 14, and an axis line C3 of the counter shaft 29 is arranged lower than the division plane B and to the rear of the crankshaft 21. This shortens the front-rear length of the engine 13, improving the degree of freedom in layout thereof. The change mechanism 24 is arranged to the rear of the main shaft 28 and at a slightly upper position thereof.

As shown in FIG. 3, in a lower inside of the crankcase 14, first and second oil pumps 31, 32 are arranged, with a drive shaft 33 oriented along the left-right direction being shared therebetween. The first oil pump 31 is used for force-feeding oil to each portion in the engine, and a discharge port thereof is connected to a main oil gallery (not shown in the figure) via a main oil feed passage 34. On the other hand, the second oil pump 32 is a source of oil pressure for actuating the twin clutch 26, and a discharge port thereof is connected to an oil feed passage 35 to the twin clutch 26. Reference numeral 37 denotes a strainer which extends downwardly from the oil pumps 31, 32 and is immersed in engine oil in an oil pan 36 at the bottom of the crankcase 14. Reference numeral 38 denotes a water pump disposed on the lower right side of the crankcase 14, the water pump having a drive shaft coaxial with that of the oil pumps 31, 32.

Figure 5:
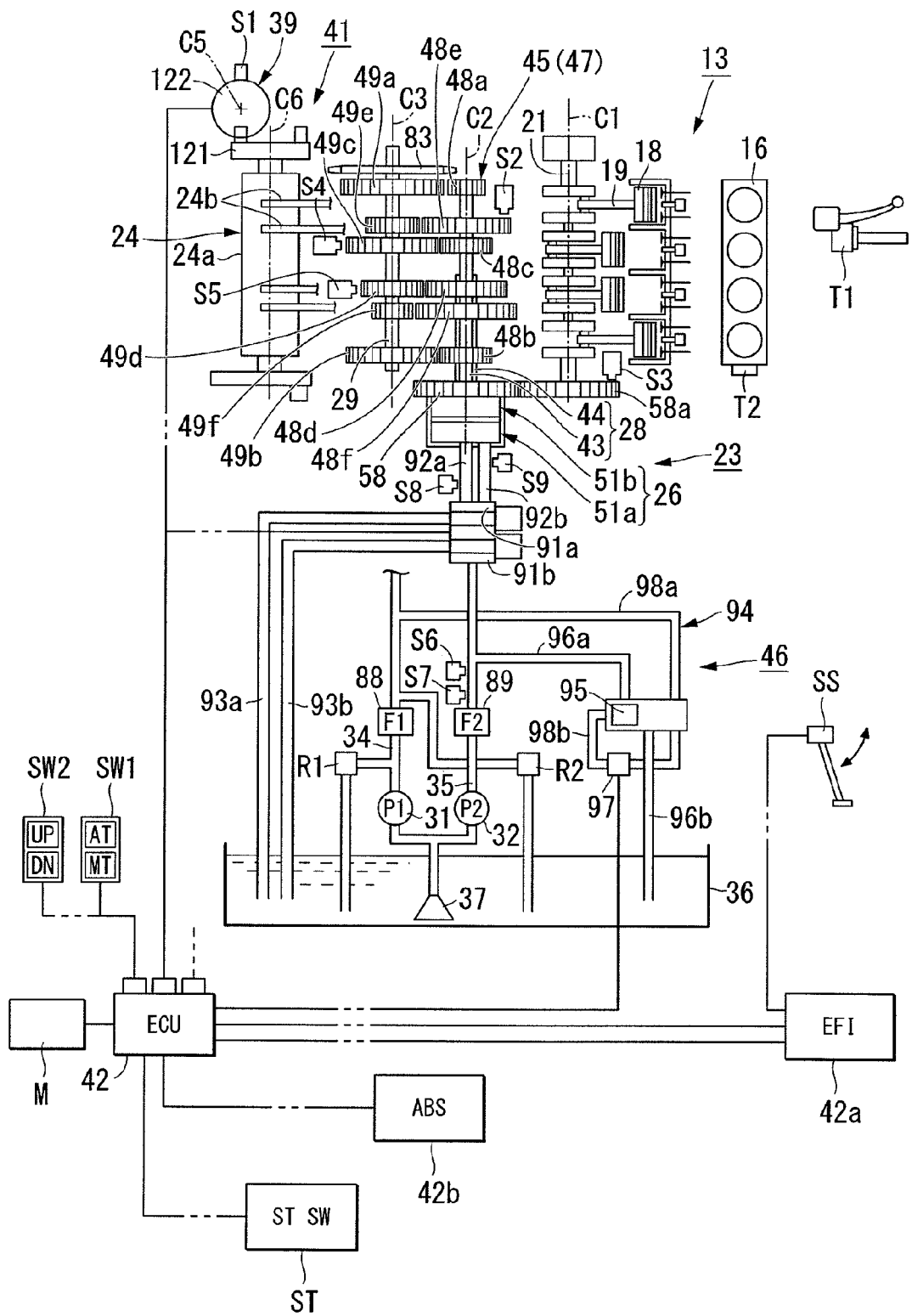
FIG. 5 is a block diagram of the twin-clutch transmission.

Here, as shown in FIG. 5, the two-wheeled motor vehicle 1 includes an automatic transmission system mainly consisting of: the twin-clutch transmission 23 connected to the engine 13; a gear shift device 41 in which the change mechanism 24 is provided with a drive mechanism 39; and an electronic control unit (ECU) 42 that controls the actuations of the twin-clutch transmission 23 and the gear shift device 41.

Figure 4:
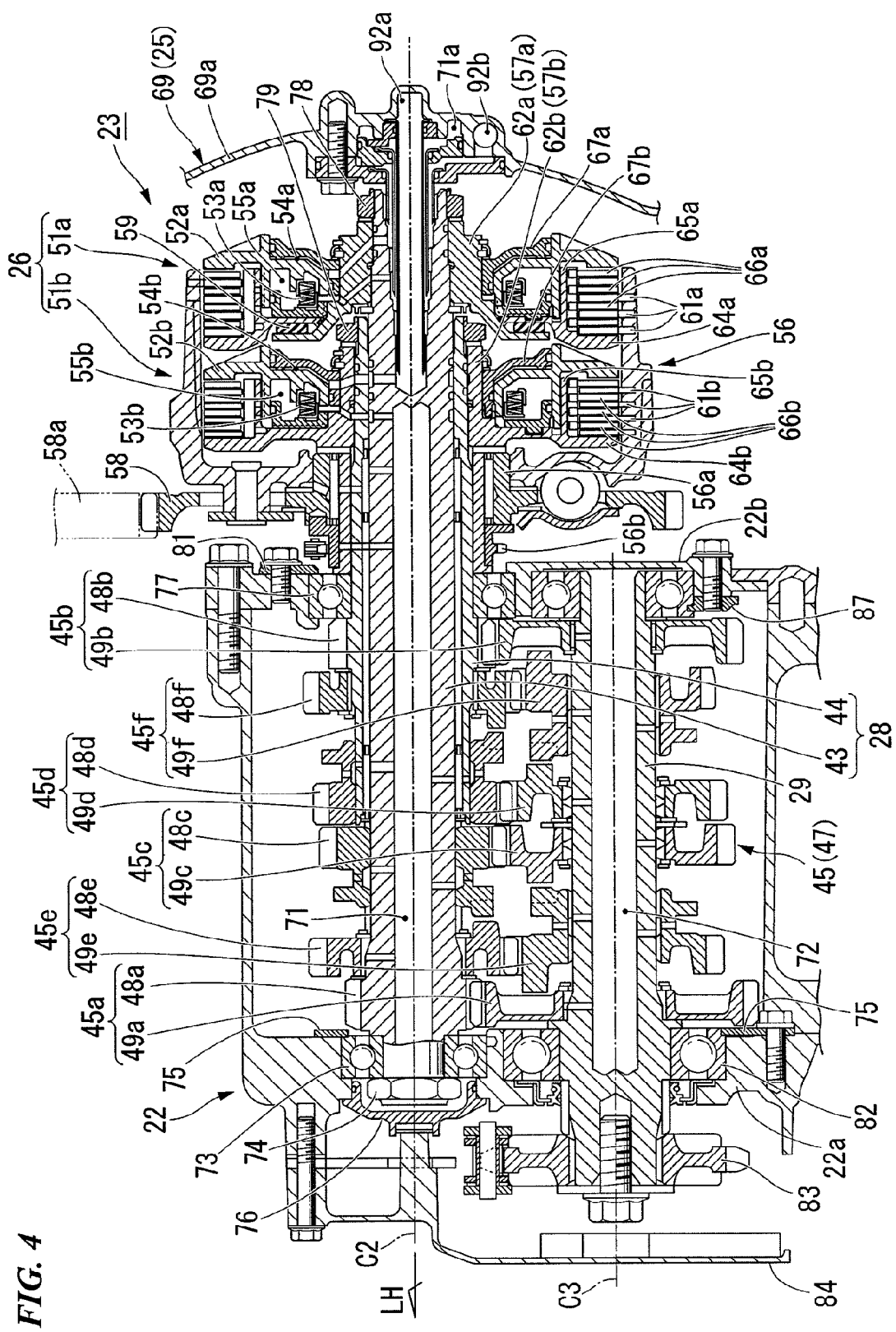
FIG. 4 is a cross-sectional view showing a twin-clutch transmission of the engine.

With additional reference to FIG. 4, the twin-clutch transmission 23 has: the main shaft 28 with a double structure consisting of inner and outer shafts 43, 44; the counter shaft 29 arranged parallel to the main shaft 28; a transmission gear group 45 arranged astride between the main shaft 28 and the counter shaft 29; the twin clutch 26 coaxially arranged on a right end portion of the main shaft 28; and an oil pressure supply device 46 for supplying oil pressure to the twin clutch 26 for the actuation thereof. Hereinafter, an aggregate consisting of the main shaft 28, the counter shaft 29, and the transmission gear group 45 is sometimes referred to as a transmission 47.

The main shaft 28 has a structure in which a right side portion of the inner shaft 43 extending in the left-right direction of the transmission case 22 is inserted through the outer shaft 44. On outer circumferences of the inner and outer shafts 43, 44, drive gears 48a to 48f for six speeds in the transmission gear group 45 are arranged side by side. On the other hand, on an outer circumference of the counter shaft 29, follower gears 49a to 49f for six speeds in the transmission gear group 45 are arranged. The drive gears 48a to 48f and the follower gears 49a to 49f mesh with each other, respectively, thus constituting transmission gear pairs 45a to 45f corresponding to the respective gear speeds. Note that the transmission gear pairs 45a to 45f have a smaller reduction ratio (higher gear ratio) in order from first gear to sixth gear.

The twin clutch 26 consists of the hydraulic first and second disk clutches (each of which is sometimes referred to simply as a clutch, hereinafter) 51a, 51b arranged adjacent to each other in a coaxial manner. To the clutches 51a, 51b, the inner and outer shafts 43, 44 are coaxially coupled, respectively. The clutches 51a, 51b are independently capable of being connected/disconnected with the presence and absence of an oil supply from the oil pressure supply device 46.

Through the rotation of the shift drum 24a arranged parallel to the shafts 28, 29, the change mechanism 24 moves a plurality of shift forks 24b, to thereby switch the transmission gear pairs for use in a force transfer to the counter shaft 29. To the left end of the shift drum 24a, the drive mechanism 39 is disposed. Note that reference numeral S1 in FIG. 5 denotes sensors (a pair of switch cams 131, and first and second switches 133, 134, which will be described later) that detect an actuation amount of the drive mechanism 39 for detection of a transmission gear of the transmission 47.

Based not only on information from the aforementioned sensors, but also on information from an opening degree sensor T1 for a throttle grip, an opening degree sensor T2 for a throttle valve of the throttle body 16, a retraction sensor SS for a side stand (or a center stand), and on other information from a mode switch SW1 and a shift switch SW2 provided on, for example, a steering wheel, the electronic control unit (ECU) 42 controls the actuations of the twin-clutch transmission 23 and the gear shift device 41, to thereby change transmission gears (shift positions) of the transmission 47.

Transmission modes selected by the mode switch SW1 includes: a full automatic mode that automatically switches the transmission gears based on motor vehicle driving information such as a vehicle velocity and the number of rotations of the engine; and a semi-automatic mode that switches the transmission gears through the operation on the shift switch SW2 based on the intention of the driver. The current transmission mode and transmission gear are appropriately displayed on a meter device M provided, for example, in the vicinity of the steering wheel. Note that the ECU 42 shares the information from the sensors with an ECU 42a for a fuel injection device and an ECU 42b for an antilock brake device.

One of the clutches 51a, 51b is connected and the other is disconnected to use any of the transmission gear pairs connected to one of the inner and outer shafts 43, 44, to thereby transfer a force. At the same time, the transmission pair to be used next is selected from among the transmission gear pairs connected to the other of the inner and outer shafts 43, 44 is previously selected. In this state, the one of the clutches 51a, 51b is disconnected, and at the same time the other is connected. This switches to the force transfer using the previously selected transmission gear pair. Thus, upshifting or downshifting of the transmission 47 is performed. In FIG. 5, reference numeral S2 denotes a vehicle velocity sensor that detects the number of rotations of the main shaft 28 for the detection of the vehicle velocity (detects the number of rotations of a drive gear 48e in mesh with a follower gear 49e which integrally rotates with the counter shaft 29. Reference numeral S3 denotes an RPM sensor that detects the number of rotations of a primary drive 58a for the detection of the number of rotations of the engine (the number of rotations of the crankshaft). Reference numerals S4, S5 denote RPM sensors that detect the numbers of rotations of the inner and outer shafts 43, 44, respectively (detect the numbers of rotations of follower gears 49c, 49d in mesh with drive gears 48c, 48d which integrally rotate with the inner and outer shafts 43, 44, respectively).

Figure 6:
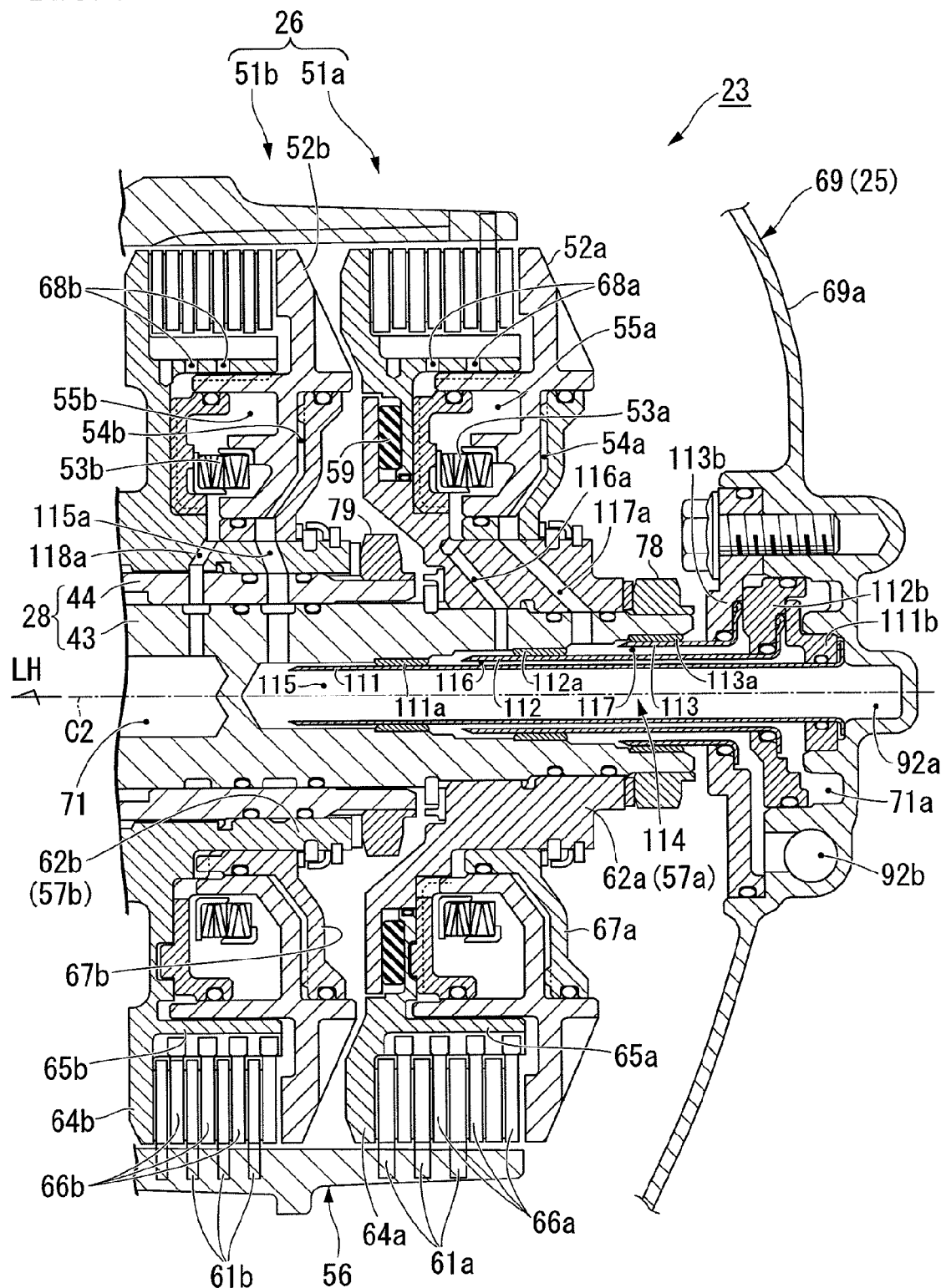
FIG. 6 is a cross-sectional view showing the twin-clutch transmission.

As shown in FIG. 6, the twin clutch 26 has the first clutch 51a for odd-numbered gears arranged on the right side (on the outside in the vehicle width direction) and the second clutch 51b for even-numbered gears arranged on the left side (on the inside in the vehicle width direction) in the clutch case 25 (in an oil pressure chamber). Each of the clutches 51a, 51b is a wet multiple-plate clutch in which a plurality of clutch plates are stacked in the axial direction thereof. The right side portion of the clutch case 25 functions as a clutch cover 69 that is detachably fixed with a plurality of bolts (see FIGS. 3 and 4). The first clutch 51a is disposed closer to the right outside wall 69a of the clutch cover 69.

The clutches 51a, 51b are hydraulic ones in which the pressure plates 52a, 52b are each displaced in the axial direction by a supply oil pressure from the outside, to thereby exerting a predetermined engaging force. The clutches 51a, 51b respectively have: rebounding springs 53a, 53b for biasing the pressure plates 52a, 52b to a clutch disconnection side; connection side oil pressure chambers 54a, 54b for imparting pressure forces to the pressure plates 52a, 52b in the direction of a clutch connection side; and disconnection side oil pressure chambers 55a, 55b for imparting pressure forces to the pressure plates 52a, 52b in the direction of a clutch disconnection side, to thereby compensate pressures of the rebounding operation (cancel the increased amounts of the pressure forces by centrifugal forces of the clutches 51a, 51b). The oil pressure of the first oil pump 31 is always applied to the disconnection side oil pressure chambers 55a, 55b in a comparatively low pressure state. On the other hand, a comparatively high oil pressure from the oil pressure supply device 46 is capable of being supplied to the connection side oil pressure chambers 54a, 54b.

With additional reference to FIG. 4, the clutches 51a, 51b share a single clutch outer 56, and have substantially the same diameter. The clutch outer 56 has a cylindrical shape with a bottom that opens in the right direction. On the interior left side thereof, the clutch center 57a for the first clutch 51a is arranged. On the interior right side thereof, the clutch center 57b for the second clutch 51b is arranged.

To the left side of the bottom of the clutch outer 56, a primary driven gear 58 is coupled via a spring damper. With the primary driven gear 58, the primary drive gear 58a of the crankshaft 21 meshes. The clutch outer 56 has its hub portion 56a relatively rotatably supported on the main shaft 28 (outer shaft 44) via a needle bearing, and hence integrally rotates with the crankshaft 21 when the crankshaft 21 rotates. On the left side of the primary driven gear 58 in the hub portion 56a of the clutch outer 56, a drive sprocket 56b for driving the oil pumps 31, 32 is integrally rotatably provided. On the inner circumferential right side of the outer wall portion of the clutch outer 56, a plurality of clutch plates 61a for the first clutch 51a are relatively unrotatably supported. On the inner circumferential left side of the outer wall portion of the clutch outer 56, a plurality of clutch plates 61b for the second clutch 51b are relatively unrotatably supported.

The clutch center 57a of the first clutch 51a has its central cylinder portion 62a spline-fitted onto the right end portion of the inner shaft 43 that protrudes rightward further than the right end portion of the outer shaft 44, and is also integrally fixed thereon with a lock nut 78. The left side portion of the clutch center 57a is a flange portion 64a that expands toward the inner circumference of the outer wall portion of the clutch outer 56. On a radially middle portion of the flange portion 64a, an internal wall portion 65a is provided in a manner protruding rightward. On the outer circumference of the internal wall portion 65a, a plurality of clutch disks 66a are relatively unrotatably supported. The clutch disks 66a and the clutch plates 61a are alternately arranged in the clutch axis direction.

To the right of the flange portion 64a, the pressure plate 52a is opposingly arranged with a predetermined gap therebetween. Between the outer circumferential side of the pressure plate 52a and the outer circumferential side of the flange portion 64a, the clutch plates 61a and the clutch disks 66a are arranged in a stacked manner. Between the inner circumferential side of the pressure plate 52a and the inner circumferential side of the flange portion 64a, the disconnection side oil pressure chamber 55a is formed, and also the rebounding spring 53a is disposed for biasing the pressure plate 52a in the right direction (to the side of spacing away from the flange portion 64a, to the clutch disconnection side).

To the right of the inner circumferential side of the pressure plate 52a, a support flange portion 67a integrally provided on the outer circumference of the central cylinder portion 62a is opposingly arranged. Between the support flange portion 67a and the inner circumferential side of the pressure plate 52a, the connection side oil pressure chamber 54a is formed.

Here, the flange portion 64a has a structure divided into inner and outer circumferential side entities. Between the inner and outer divided entities, the damper member 59 made of an elastic material such as a rubber is provided. This enhances shock absorbing capability in connection/disconnection of the first clutch 51a.

On the other hand, the clutch center 57b of the second clutch 51b has its central cylinder portion 62b spline-fitted onto the right end portion of the outer shaft 44, and is also integrally fixed thereon with a lock nut 79. The left side portion of the clutch center 57b is a flange portion 64b that expands toward the inner circumference of the outer wall portion of the clutch outer 56. On a radially middle portion of the flange portion 64b, an internal wall portion 65b is provided in a manner protruding rightward. On the outer circumference of the internal wall portion 65b, a plurality of clutch disks 66b are relatively unrotatably supported. The clutch disks 66b and the clutch plates 61b are alternately arranged in the clutch axis direction.

To the right of the flange portion 64b, the pressure plate 52b is opposingly arranged with a predetermined gap spaced apart. Between the outer circumferential side of the pressure plate 52b and the outer circumferential side of the flange portion 64b, the clutch plates 61b and the clutch disks 66b are arranged in a stacked manner. Between the inner circumferential side of the pressure plate 52b and the inner circumferential side of the flange portion 64b, the disconnection side oil pressure chamber 55b is formed, and also the rebounding spring 53b is disposed for biasing the pressure plate 52b in the right direction (to the side of spacing away from the flange portion 64b, to the clutch disconnection side).

To the right of the inner circumferential side of the pressure plate 52b, a support flange portion 67b integrally provided on the outer circumference of the central cylinder portion 62b is opposingly arranged. Between the support flange portion 67b and the inner circumferential side of the pressure plate 52b, the connection side oil pressure chamber 54b is formed.

The flange portion 64b has its inner and outer circumferential side entities integrally structured. However, the flange portion 64b may have a divided structure with a damper member provided therebetween, as is the case with the flange portion 64a. Here, in the clutches 51a, 51b, the clutch plates 61a, 61b are made different in thickness from each other (the clutch plates 61a of the first clutch 51a are made thicker than the clutch plates 61b of the second clutch 51b). Thereby, the clutches 51a, 51b have a different thermal capacity in spite of the same number of disks and the same diameter.

In a halt state of the engine (halt states of the oil pumps 31, 32), the clutches 51a, 51b displace the pressure plates 52a, 52b in the right direction with biasing forces of the rebounding springs 53a, 53b, to thereby bring about a clutch disconnected state where frictional engagements between the clutch plates 61a, 61b and the clutch disks 66a, 66b are released. Furthermore, even in an operating state of the engine, if the oil pressure supply from the oil pressure supply device 46 is in a halt state, the biasing forces of the rebounding springs 53a, 53b and the oil pressures of the disconnection side oil pressure chambers 55a, 55b act on the pressure plates 52a, 52b, to thereby bring about a clutch disconnected state, similarly to the above.

On the other hand, in the first clutch 51a, in an operating state of the engine and also in a state where a comparatively high oil pressure is supplied from the oil pressure supply device 46 to the connection side oil pressure chamber 54a, the pressure plate 52a is moved in the left direction (to the flange portion 64a side, to the clutch connection side) while resisting the oil pressure of the disconnection side oil pressure chamber 55a and the biasing force of the rebounding spring 53a. Then, the clutch plates 61a and the clutch disks 66a are pressed against each other in a sandwiched manner into frictional engagement, to thereby bring about a clutch connected state that enables a torque transfer between the clutch outer 56 and the clutch center 57a.

Similarly, in the second clutch 51b, in an operating state of the engine and also in a state where a comparatively high oil pressure is supplied from the oil pressure supply device 46 to the connection side oil pressure chamber 54b, the pressure plate 52b is moved in the left direction (to the flange portion 64b side, to the clutch connection side) while resisting the oil pressure of the disconnection side oil pressure chamber 55b and the biasing force of the rebounding spring 53b. Then, the clutch plates 61b and the clutch disks 66b are pressed against each other in a sandwiched manner into frictional engagement, to thereby bring about a clutch connected state that enables a torque transfer between the clutch outer 56 and the clutch center 57b.

When the oil pressure supply to the connection side oil pressure chambers 54a, 54b is halted in the clutch connected states of the clutches 51a, 51b, the pressure plates 52a, 52b are displaced in the left direction by the oil pressure of the disconnection side oil pressure chambers 55a, 55b and the biasing forces of the rebounding springs 53a, 53b. As a result, the frictional engagements between the clutch plates 61a, 61b and the clutch disks 66a, 66b are released, to thereby bring about the clutch disconnected state where the torque transfer between the clutch outer 56 and the clutch centers 57a, 57b is disabled. In this manner, by use of the oil pressure of the disconnection side oil pressure chambers 55a, 55b in addition to the biasing forces of the rebounding springs 53a, 53b, it is possible to securely move the pressure plates 52a, 52b even in the case where the oil pressures by the centrifugal force are left in the connection side oil pressure chambers 54a, 54b.

Here, the engine oil supplied to the disconnection side oil pressure chambers 55a, 55b of the respective clutches 51a, 51b is guided out of the oil pressure chambers via oil passages 68a, 68b formed in the internal wall portions 65a, 65b, and then is supplied to the clutch plates 61a, 61b and the clutch disks 66a, 66b of the internal wall portions 65a, 65b, respectively. In this manner, by releasing the actuation oil in the disconnection side oil pressure chambers 55a, 55b, it is possible to maintain the disconnection side oil pressure chambers 55a, 55b in a low pressure state, and also to improve the lubricity and coolability of the clutch plates 61a, 61b and the clutch disks 66a, 66b in a disconnected state.

The oil passage 68a, 68b may be formed in the flange portion 64a of the clutch center 57a so as to be substantially perpendicular to the clutch axis direction, as is the case with an oil passage 168 shown in FIG. 7A. Alternatively, the oil passage 68a, 68b may be formed in the flange portion 64a of the clutch center 57a so as to be substantially parallel to the clutch axis direction, as is the case with an oil passage 268 shown in FIG. 7B. FIG. 7A and FIG. 7B show the first clutch 57a. The similar modification is applicable to the second clutch 51b.

As shown in FIG. 4, the transmission 47 is of a constant mesh type in which the drive gears 48a to 48f are always in mesh with the corresponding follower gears 49a to 49f. The gears are roughly divided into: free gears that are relatively rotatable about the shaft; and slide gears that are spline-fitted onto the shaft. An appropriate slide of an optional slide gear by the change mechanism 24 allows for a force transfer by use of a transmission gear pair corresponding to any of the gear speeds.

In the interiors of the main shaft 28 (inner shaft 43) and the counter shaft 29, there are respectively formed main oil supply passages 71, 72 capable of supplying the oil pressure from the first oil pump 31. The engine oil is appropriately supplied to the transmission gear group 45 via the main oil supply passages 71, 72.

The inner shaft 43 of the main shaft 28 has a hollow cylindrical shape with a comparatively thick wall. The inner shaft 43 is relatively rotatably inserted through the outer shaft 44, which has a cylindrical shape with a comparatively thin wall, via the needle bearing.

The left end portion of the inner shaft 43 extends to a left outside wall 22a of the transmission case 22, and is rotatably supported by the left outside wall 22a via the ball bearing 73. The left end portion of the inner shaft 43 protrudes to the left of the ball bearing 73. Onto the protruded portion, a lock nut 74 is threaded. The inner race of the ball bearing 73 is tightened and fixed by the lock nut 74 and the stepped portion of the inner shaft 43.

Figure 8:
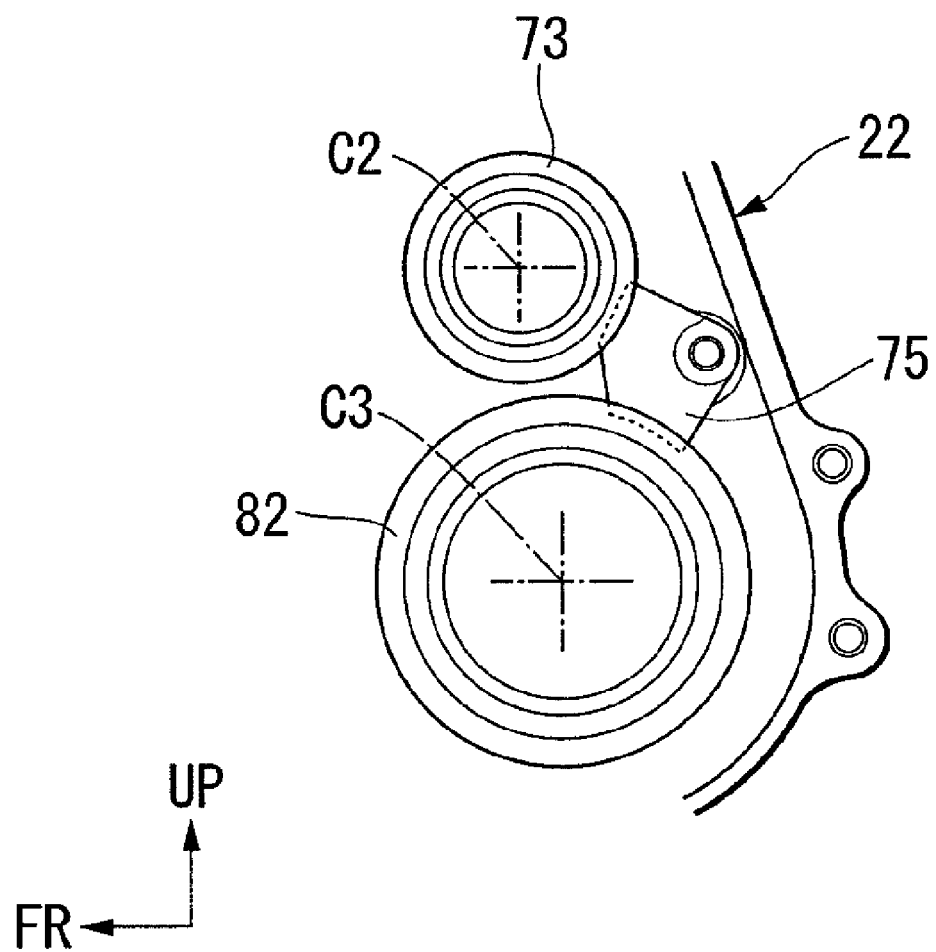
FIG. 8 is a side view showing a bearing holder that holds ball bearings supporting left ends of shafts of the twin-clutch transmission.

With additional reference to FIG. 8, onto the left outside wall 22a of the transmission case 22, holder plates 75 are fixed with a bolt from inside the case. An outer race of the ball bearing 73 is tightened and fixed by the holder plate 75 and the stepped portion of the left outside wall 22a of the transmission case 22. As a result, positioning of the inner shaft 43 in the axial direction is performed via the ball bearing 73. The left end portion of the inner shaft 43 extends through the left outside wall 22a of the transmission case 22. The through-hole (support bore of the ball bearing 73) for the inner shaft 43 in the left outside wall 22a is oil-tightly sealed by a seal cap 76 attached to the outside of the transmission case 22.

The right end portion of the inner shaft 43 extends through the right side wall (which is also the left side wall of the clutch case 25) 22b of the transmission case 22 to the vicinity of the right outside wall 69a of the clutch case 25 (clutch cover 69). Onto this right end portion, the clutch center 57a of the first clutch 51a is fitted relatively unrotatably. The middle portion in the left-right direction of the inner shaft 43 is rotatably supported by the right side wall 22b of the transmission case 22 via the outer shaft 44 and the ball bearing 77. Onto the right end portion of the inner shaft 43, the lock nut 78 is threaded. The central cylinder portion 62a of the clutch center 57a is tightened and fixed by the lock nut 78 and the thrust bearing portion of the inner shaft 43.

The outer shaft 44 is shorter than the inner shaft 43. The left end portion of the outer shaft 44 terminates in the middle portion in the left-right direction of the transmission case 22. Around the site of the outer shaft 44 positioned further leftward than the ball bearing 77, the drive gears 48b, 48d, 48f corresponding to even-numbered gears (second, fourth, sixth gears) of the transmission gear group 45 are supported so as to be arranged in this order starting from the left. On the other hand, around the site of the inner shaft 43 positioned further leftward than the left end portion of the outer shaft 44, the drive gears 48a, 48c, 48e corresponding to odd-numbered gears (first, third, fifth gears) of the transmission gear group 45 are supported so as to be arranged in this order starting from the left.

The right end portion of the outer shaft 44 extends through the right side wall 22b of the transmission case 22 to the interior of the clutch case 25. Onto this right end portion, the clutch center 57b of the second clutch 51b is fitted relatively unrotatably. Around the site of the outer shaft 44 positioned between the clutch center 57b and the ball bearing 77, the clutch outer 56 (and the primary driven gear 58) are supported relatively rotatably.

Onto the right end portion of the outer shaft 44, the lock nut 79 is threaded. By the lock nut 79 and the thrust bearing portion of the outer shaft 44, the inner race of the ball bearing 77, the distance collar on the internal side of the hub portion 56a of the clutch outer 56, and the central cylinder portion 62b of the clutch center 57b are tightened and fixed.

On the right side wall 22b of the transmission case 22, a holder plate 81 is fixed with a bolt from the outside of the case (from the clutch case 25 side). The outer race of the ball bearing 77 is tightened and fixed by the holder plate 81 and the stepped portion of the right side wall 22b of the transmission case 22. As a result, positioning of the outer shaft 44 with respect to the transmission case 22 in the axial direction is performed via the ball bearing 77.

The left portion of the counter shaft 29 is rotatably supported by the left outside wall 22a of the transmission case 22 via a ball bearing 82. The left end portion of the counter shaft 29 protrudes to the left of the ball bearing 82. Onto this left end portion, the drive sprocket 83 of the force transfer mechanism to the rear wheel 11 is spline-fitted, and is fixed with a bolt. The periphery of the drive sprocket 83 and the seal cap 76 is covered with a sprocket cover 84 that is attached to the left side of the transmission case 22. The outer race of the ball bearing 82 is tightened and fixed by the holder plate 75 and the stepped portion of the left outside wall 22a of the transmission case 22 (see FIG. 8).

The right end portion of the counter shaft 29 is rotatably supported by the right side wall 22b of the transmission case 22 via a ball bearing 86. On the right side wall 22b of the transmission case 22, a holder plate 87 is fixed with a bolt. The outer race of the ball bearing 86 is tightened and fixed by the holder plate 87 and the stepped portion of the right side wall 22b of the transmission case 22. Around the site of the counter shaft 29 positioned between the ball bearings 82, 86, the follower gears 49a to 49f corresponding to the respective gear speeds of the transmission gear group 45 are supported in an order similar to that of the drive gears 48a to 48f.

Here, the transmission 47 is structured as a cartridge that is capable of being removed out of the transmission case 22 integrally with the right side wall 22b of the transmission case 22.

The right side wall 22b of the transmission case 22 is structured so as to be attachable/detachable to/from the case proper with a plurality of bolts. The right side wall 22b functions as a transmission holder for holding the transmission 47 as a single unit.

An outline of how the transmission 47 is removed out of the transmission case 22 will be described. First, in the left side of the case, the sprocket cover 84 and the seal cap 76 are removed. Then, the lock nut 74 is removed from the left end portion of the main shaft 28, and also the drive sprocket 83 is removed from the left end portion of the counter shaft 29. Subsequently, in the right side of the case, the clutch cover 69 is removed, and the lock nut 78, the clutch center 57a, and the like are removed from the inner shaft 43. Then, the lock nut 79, the clutch center 57b, the clutch outer 56, and the like are removed from the outer shaft 44. After that, the transmission 47 is pulled out together with the transmission holder to the right of the transmission case 22. At this time, the ball bearing 73 for supporting the left end portion of the main shaft 28 and the ball bearing 82 for supporting the left end portion of the counter shaft 29 remain held on the left outside wall 22a of the transmission case 22 by means of the holder plate 75.

As shown in FIG. 5, the oil pressure supply device 46 mainly consists of: the oil pumps 31, 32; the main oil feed passage 34 extending the discharge port of the first oil pump 31; a first oil filter 88 arranged in the main oil feed passage 34; the oil feed passage 35 extending from the discharge port of the second oil pump 32; a second oil filter 89 arranged in the oil feed passage 35; first and second solenoid valves (proportional type linear solenoid valves) 91a, 91b connected to the downstream side of the oil feed passage 35; first and second oil supply passages 92a, 92b extending respectively from the solenoid valves 91a, 91b to the connection side oil pressure chambers 54a, 54b of the clutches 51a, 51b; and an oil pressure cut-off device 94 that returns the oil pressure from the second oil pump 32 to an oil pan 36 at the start of the engine.

Reference numerals S6, S7 respectively denote an oil pressure sensor and an oil temperature sensor provided on the main oil feed passage 34 for detecting an oil pressure and an oil temperature. Reference numerals R1, R2 denote relief valves provided in a branch oil passage from the main oil feed passage 34 or the oil feed passage 35, the relief valves being actuated when the oil pressure has exceeded a predetermined value. Reference numerals S8, S9 respectively denote oil pressure sensors provided on the oil supply passages 92a, 92b for detecting supply oil pressures to the clutches 51a, 51b.

The oil feed passage 35 is communicable individually with either of the oil supply passages 92a, 92b through actuation by the solenoid valves 91a, 91b. When the oil feed passage 35 is in communication with either of the oil supply passages 92a, 92b, a comparatively high oil pressure from the second oil pump 32 is supplied to either of the connection side oil pressure chambers 54a, 54b of the clutches 51a, 51b via the oil supply passages 92a, 92b.

To be more specific, when current is not applied to the first solenoid valve 91a, the communication between the oil feed passage 35 and the first oil supply passage 92a is blocked. Then, the oil pressure from the second oil pump 32 and the oil pressure in the connection side oil pressure chamber 54a are returned to the oil pan 36 via a return oil passage 93a. On the other hand, when current is applied to the first solenoid valve 91a, the oil feed passage 35 is communicated with the first oil supply passage 92a, allowing the oil pressure from the second oil pump 32 to be supplied to the connection side oil pressure chamber 54a via the first oil supply passage 92a.

Similarly, when current is not applied to the second solenoid valve 91b, the communication between the oil feed passage 35 and the second oil supply passage 92b is blocked. Then, the oil pressure from the second oil pump 32 and the oil pressure in the connection side oil pressure chamber 54b are returned to the oil pan 36 via a return oil passage 93b. When current is applied to the second solenoid valve 91b, the oil feed passage 35 and the second oil supply passage 92b are communicated, allowing the oil pressure from the second oil pump 32 to be supplied to the connection side oil pressure chamber 54b via the second oil supply passage 92b.

From the oil feed passage 35 at a location further downstream than the second oil filter 89, an oil pressure release oil passage 96a is branched. The oil pressure release oil passage 96a is connected to an oil pressure release oil passage 96b via an oil pressure release valve 95. Furthermore, from the main oil feed passage 34 at a location further downstream than the first oil filter 88, an oil pressure switching oil passage 98a is branched. The oil pressure switching oil passage 98a is connected to an oil pressure switching oil passage 98b via an oil pressure switching valve 97. The oil pressure switching oil passage 98b is connected to the oil pressure release valve 95. With the opening/closing of the oil pressure switching valve 97, the oil pressure from the main oil feed passage 34 is used to actuate the oil pressure release valve 95. The oil pressure cut-off device 94 mainly consists of these oil passages and valves.

With the actuation of the oil pressure release valve 95, the oil pressure release oil passages 96a, 96b are communicated with/cut off from each other. When the oil pressure release oil passages 96a, 96b are in communication, the oil pressure from the second oil pump 32 is released to the oil pan 36 via the oil pressure release oil passages 96a, 96b. Thereby, the oil pressure is ceased to be supplied from the solenoid valves 91a, 91b to the clutches 51a, 51b. This maintains the clutches 51a, 51b in a disconnected state, and also reduces the load on the second oil pump 32.

On the other hand, when the oil pressure release oil passages 96a, 96b are blocked, the oil pressure from the second oil pump 32 is not returned to the oil pan 36. As a result, the oil pressure is supplied to the solenoid valves 91a, 91b. In this condition, an actuation of the solenoid valves 91a, 91b supplies an oil pressure to the clutches 51a, 51b, switching them to a clutch connected state.

In the twin-clutch transmission 23, after the start of the engine and also while the two-wheeled motor vehicle 1 is at rest, the action of the oil pressure cut-off device 94 keeps both of the clutches 51a, 51b in a disconnected state. At this time, the transmission 47 is shifted from a neutral state where a force transfer is blocked for preparation for setting the two-wheeled motor vehicle 1 in motion to a first gear state where a force transfer is enabled via a first gear (start gear, transmission gear pair 45a) by, for example, a retraction of the side stand (in a full automatic mode), an operation on the shift switch (in a semi-automatic mode), or the like. In this state, for example, an increase in the number of rotations of the engine brings the first clutch 51a into a connected state via a half clutch position, setting the two-wheeled motor vehicle 1 in motion.

Furthermore, when the two-wheeled motor vehicle 1 is moving, the twin-clutch transmission 23 transfers a force via either of the inner and outer shafts 43, 44 and any of the transmission gear pairs 45a to 45f, with only one of the clutches 51a, 51b corresponding to the current shift position being in a connected state and the other being left disconnected (alternatively, the twin-clutch transmission 23 waits with both of the clutches being in a connected state and the transmission being in a neutral state). At this time, the ECU 42 controls the actuation of the twin-clutch transmission 23 based on vehicle drive information, and previously creates a state that allows for a force transfer via a transmission gear pair corresponding to the next shift position.

To be more specific, if the current shift position is in an odd-numbered gear (or an even-numbered gear), then the next shift position is in an even-numbered gear (or an odd-numbered gear). Therefore, the engine output is transferred to the inner shaft 43 (or the outer shaft 44) via the first clutch 51a (or the second clutch 51b) in a connected state. At this time, the second clutch 51b (or the first clutch 51a) is in a disconnected state, and hence the engine output is not transferred to the outer shaft 44 (or the inner shaft 43) (or both of the clutches are in a connected state, but the transmission is in a neutral state, thus preventing the engine output from being transferred).

After this, when the ECU 42 determines that a shift timing has been reached, a simple operation of bringing the first clutch 51a (or the second clutch 51b) into a disconnected state and also of bringing the second clutch 51b (or the first clutch 51a) into a connected state switches to the force transfer that uses a transmission gear pair corresponding to the previously selected next shift position. This allows for a swift and smooth transmission without the occurrence of a time lag and an interruption of a force transfer when the gear is shifted (or if waiting in a neutral position, the shift is made to the next shift position and then the corresponding clutch is connected).

As shown in FIGS. 2 and 3, to the lower right side of the crankcase 14 and also to the lower portion of the clutch cover 69, a body 101 of the oil pressure cut-off device 94 of the oil pressure supply device 46 is attached. Inside the body 101, a valve container portion 102 of the oil pressure release valve 95 and a valve container portion 103 for the oil pressure switching valve 97 are formed substantially along the front-rear direction, and also main portions of the oil pressure release oil passages 96a, 96b and of the oil pressure switching oil passages 98a, 98b are formed, as shown in FIG. 9.

Here, because the oil pressure cut-off device 94 is arranged on the lower right side of the crankcase 14 and also on the lower portion of the clutch cover 69 of the engine 13, the oil pressure cut-off device 94 becomes less conspicuous, to thereby favorably keep an appearance of the engine 13. At the same time, protrusion of the oil pressure cut-off device 94 in the lateral direction is suppressed, to thereby make it possible to simplify the cover structure and secure the bank angle of the two-wheeled motor vehicle 1. In FIG. 3, a line GL denotes a ground level when the vehicle body is banked just before the exhaust pipe 17, which extends in the front-rear direction below the engine 13, comes in contact with the ground. Protectability of the oil pressure cut-off device 94 is enhanced by the body 101 of the oil pressure cut-off device 94 being spaced apart from this ground level.

Figure 9:
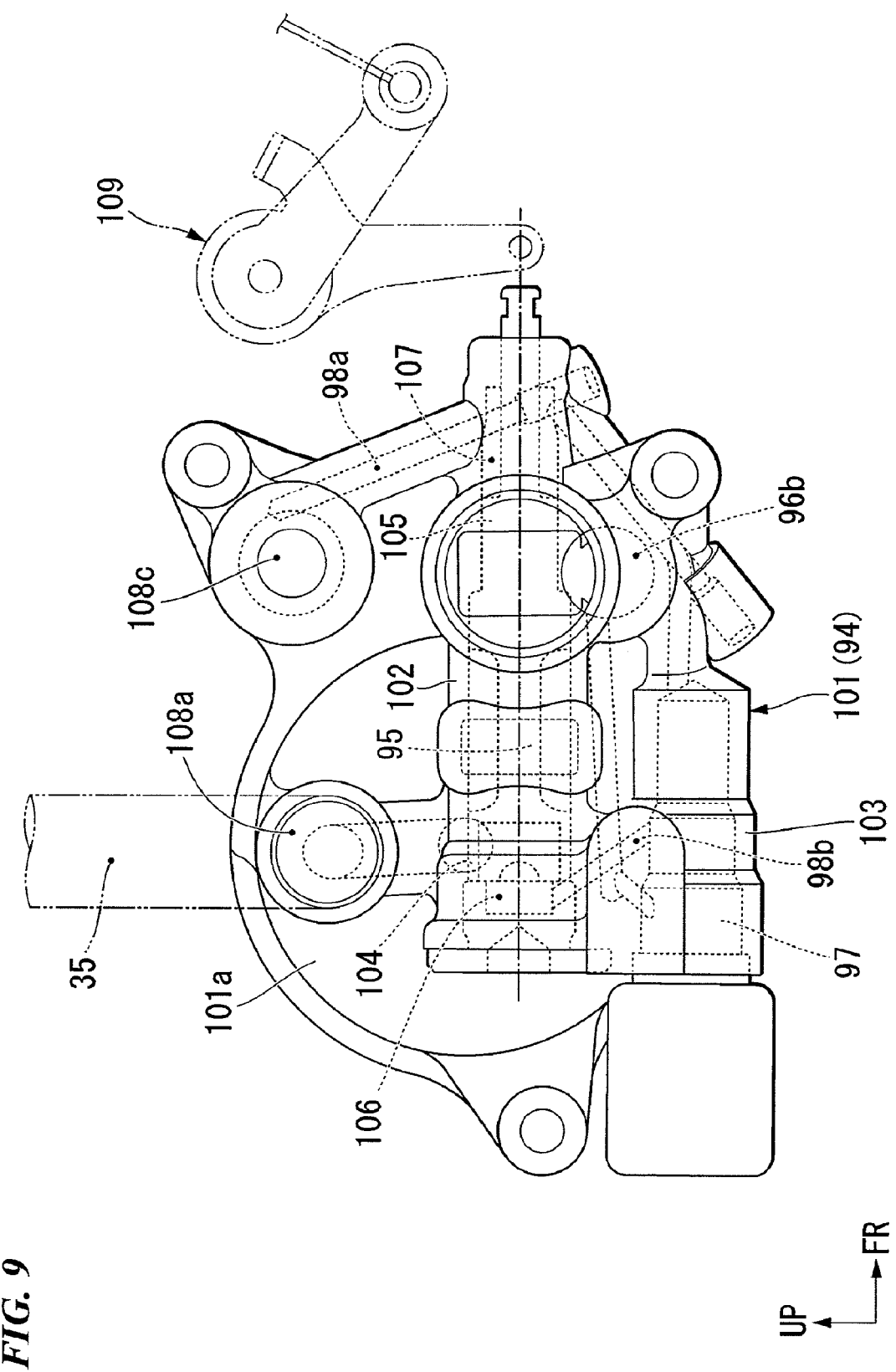
FIG. 9 is a right side view showing an oil pressure cut-off device of the twin-clutch transmission.

As shown in FIG. 9, the oil pressure release valve 95 has a rod-shaped main body with first and second pistons 104, 105 on the front and the rear thereof. The oil pressure release valve 95 is fitted into the valve container portion 102 in a manner reciprocally movable in the front-rear direction. In front of the first piston 104 and in the rear of the second piston 105 in the valve container portion 102, there are formed a release side oil pressure chamber 106 and a return side oil pressure chamber 107, respectively.

With additional reference to FIG. 3, on the inside in the vehicle width direction of the rear portion of the body 101 in the oil pressure cut-off device 94, the second oil filter 89 with a cylindrical shape oriented along the left-right direction is arranged. On the rear portion of the body 101 of the oil pressure cut-off device 94, there is integrally formed a cover 101a that covers a container portion for the second oil filter 89 in the crankcase 14 from the outside in the vehicle direction.

Then, the engine oil discharged from the second oil pump 32, after being filtered by flowing through the second oil filter 89 from its outer circumferential side to its central portion, is force-fed to the upstream side of the oil feed passage 35 via a communication portion 108a on the upper side of the cover 101a. The oil feed passage 35 extends upwardly from the communication portion 108a to the solenoid valves 91a, 91b disposed on the clutch case 25 (see FIGS. 2 and 3).

Here, the solenoid valves 91a, 91b are arranged on the same side as the twin clutch 26 and the oil pressure cut-off device 94, that is, on the right side of the engine. Thereby, it is possible to simplify oil pressure supply passages that connect these.

Figure 18:
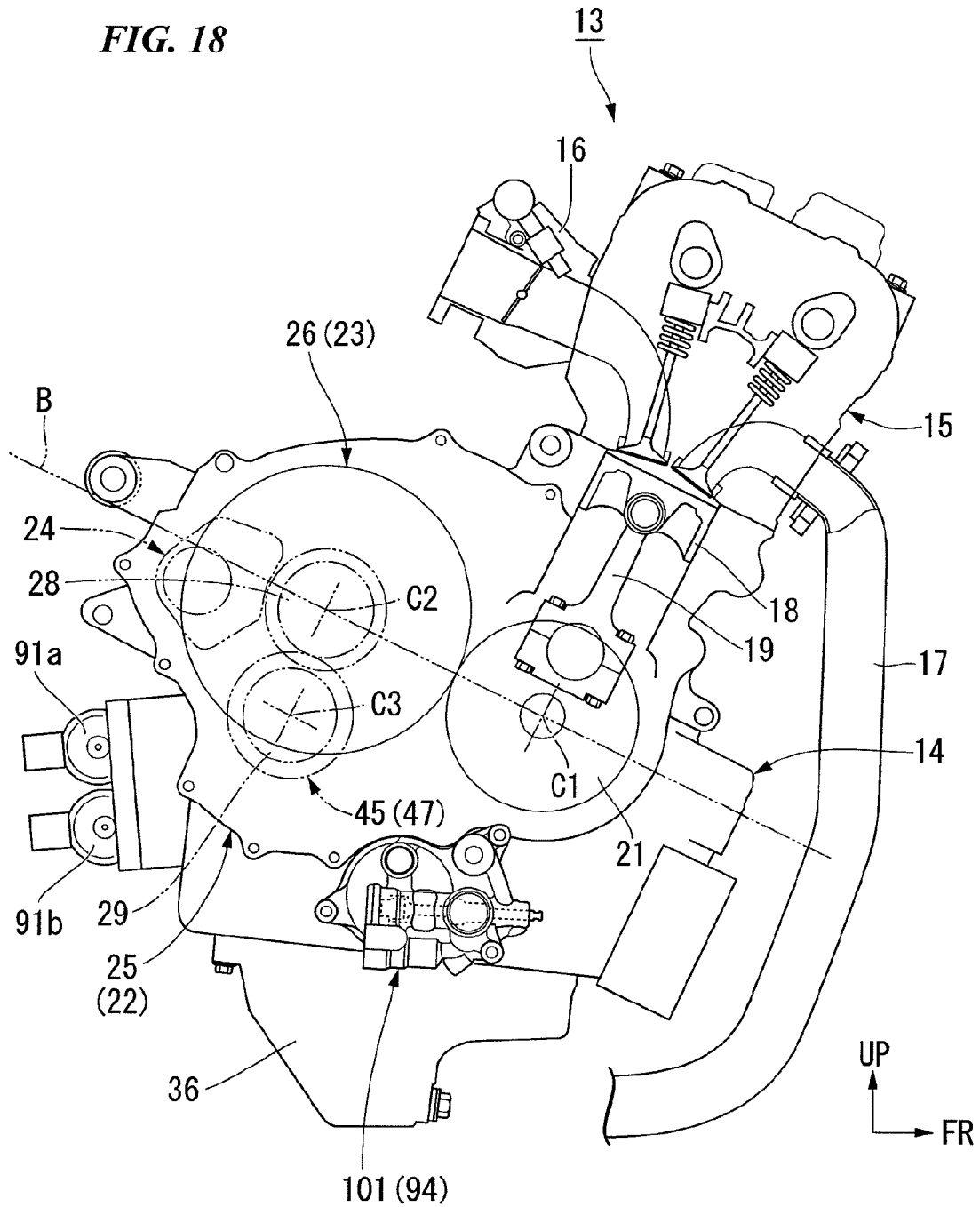
FIG. 18 shows a modification of the arrangement of a solenoid valve in the twin-clutch transmission. It is a side view corresponding to FIG. 10.

Note that the solenoid valves 91a, 91b may be disposed on the same side as the twin clutch 26 and the oil pressure cut-off device 94, that is on the right side of the engine, and also on the rear portion of the clutch case 25, as shown in FIG. 18. Also in this case, it is possible to simplify oil pressure supply passages similarly to the above.

Figure 19:
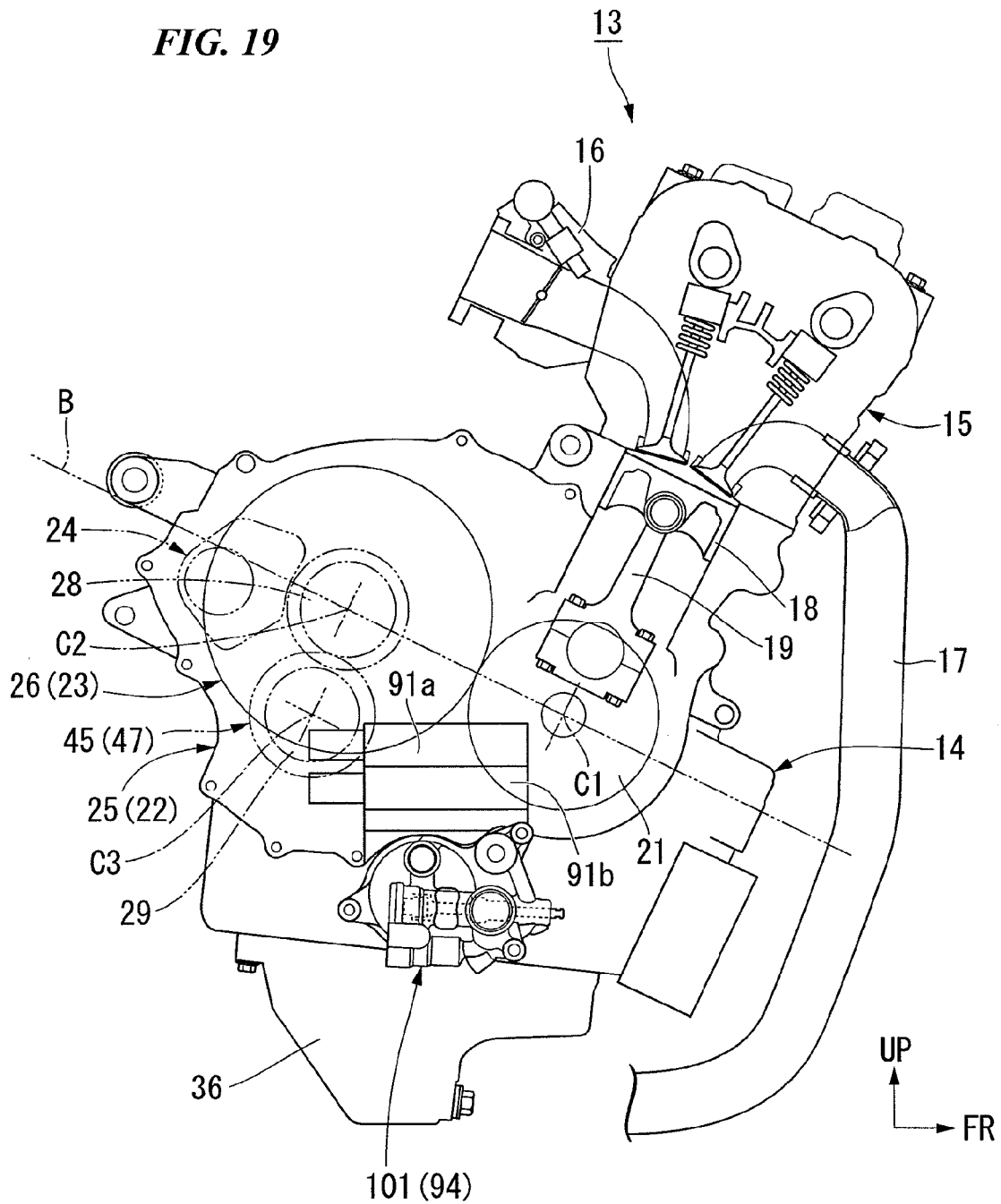
FIG. 19 shows another modification of the arrangement of a solenoid valve in the twin-clutch transmission. It is a side view corresponding to FIG. 10.
Figure 20:
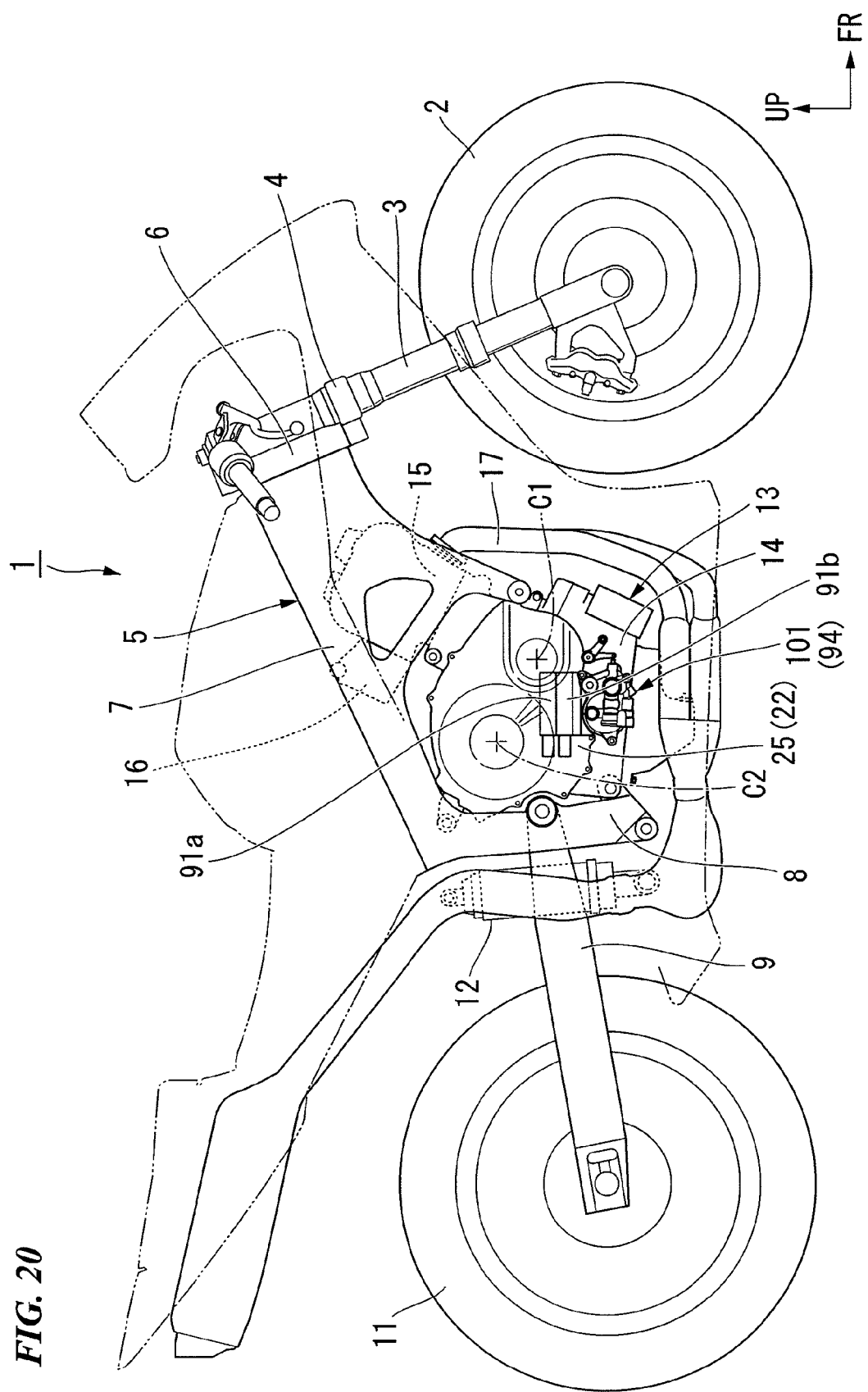
FIG. 20 is a right side view of a two-wheeled motor vehicle in which a solenoid valve is arranged as shown in FIG. 19.

Furthermore, disposition of the solenoid valves 91a, 91b on the same side as the twin clutch 26 and the oil pressure cut-off device 94 and also in the vicinity of these as shown in FIG. 19 makes it possible to further simplify the oil pressure supply passages. In addition, the solenoid valves 91a, 91b are integrally provided with the oil pressure cut-off device 94, to thereby make it possible to reduce the number of parts and the number of assembly steps. Note that FIG. 20 is a side view of a two-wheeled motor vehicle where the solenoid valves 91a, 91b are arranged as shown in FIG. 19.

With reference to FIGS. 5 and 9, the oil pressure release oil passage 96a is formed so as to extend from the inside of the cover 101a to the valve container portion 102 for the oil pressure release valve 95. The oil pressure release oil passage 96b is formed so as to extend from the valve container portion 102 to the oil pan 36.

On the other hand, the oil pressure switching oil passage 98a is formed so as to extend to the valve container portion 103 for the switching valve 97 after extending from a communication portion 108c with the main oil feed passage 34 to the return side oil pressure chamber 107. The oil pressure switching oil passage 98b is formed so as to extend from the valve container portion 103 to the release side oil pressure chamber 106.

The oil pressure switching valve 97 is a solenoid valve of a normal open type that opens the oil pressure switching oil passages 98a, 98b when current is not applied and that blocks the oil pressure switching oil passages 98a, 98b when current is applied.

When current is not applied to the oil pressure switching valve 97, a part of the oil pressure from the first oil pump 31 is supplied to the return side oil pressure chamber 107, and is supplied also to the release side oil pressure chamber 106 via the valve container portion 103. A forward biasing force to the oil pressure release valve 95 by an oil pressure supplied to the release side oil pressure chamber 106 is adapted to be larger than a rearward biasing force to the oil pressure release valve 95 by an oil pressure supplied to the return side oil pressure chamber 107. Therefore, when an oil pressure is supplied to the release side oil pressure chamber 106, the oil pressure release valve 95 moves forward in the valve container portion 102. At this time, the oil pressure release oil passages 96a, 96b are opened, and an oil pressure from the second oil pump 32 is returned to the oil pan 36.

On the other hand, when current is applied to the oil pressure switching valve 97, the oil pressure switching oil passages 98a, 98b are blocked, thus stopping the supply of an oil pressure from the first oil pump 31 to the release side oil pressure chamber 106. As a result, the oil pressure release valve 95 is moved rearward by an oil pressure in the return side oil pressure chamber 107, to thereby block the oil pressure release oil passages 96a, 96b. This makes it possible to supply an oil pressure to the solenoid valves 91a, 91b without an oil pressure from the second oil pump 32 being returned to the oil pan 36.

The actuation of the oil pressure cut-off device 94 is controlled by the ECU 42 so that: at the time of the start of the engine (when a start switch ST (see FIG. 5) is operated), the oil pressure cut-off device 94 opens the oil pressure release oil passages 96a, 96b to return an engine oil discharged from the second oil pump 32 (or to release the oil pressure) to the oil pan 36; and after the start of the engine (after complete explosion, after the number of rotations of the engine is stable in a predetermined number of idle rotations), the oil pressure cut-off device 94 blocks the oil pressure release oil passages 96a, 96b to allow a feed oil pressure to be supplied to the twin clutch 26. It may be configured such that when the side kickstand is down, the oil pressure release oil passages 96 are opened to disable the vehicle from being set in motion.

That is, because the twin clutch 26 has a large capacity and its rotational torque and load on the second oil pump 32 required at the start of the engine are heavy, the clutches 51a, 51b are in a disconnected state at the start of the engine (especially at low temperatures), and a pressure-boosting actuation of the second oil pump 32 is suppressed. Thereby, an increase in friction is suppressed to alleviate cranking load and improve the startability of the engine. In addition, the starter motor 27 and a battery (not shown in the figures) are made small and light.

Note that the engine oil pressure need not be applied to both sides of the oil pressure release valve 95 as described above. It may be configured such that an engine oil pressure is applied to one side and a spring reaction force is applied to the other side. Furthermore, as shown with a double-dot chain line on the right side in FIG. 9, there may be provided an actuation mechanism 109 that actuates the oil pressure release valve 95 by means of another external force (an electric actuator, a manual operation, or the like). Furthermore, also at times other than at the start of the engine, it is also possible to exert control so as to cut a feed oil pressure to the twin clutch 26 with a signal from the ECU 42 or the like (for example, when the side stand is out as described above, when the vehicle has fallen over, when the kill switch is in OFF position, or at other times).

As shown in FIG. 6, inside the clutch cover 69, there are disposed first, second, and third pipes 111, 112, 113 that extend from the clutch cover 69 to the right end portion of the main shaft 28 (inner shaft 43). The pipes 111, 112, 113 are arranged on top of each other in the order from the internal circumferential side with a predetermined gap therebetween in a mariner coaxial with the main shaft 28.

In the interior of the right portion of the inner shaft 43, there is formed a right hollow portion 114 whose diameter expands to the right in roughly three steps. The right hollow portion 114 is separated with a division wall from the main oil supply passage 71 that extends from the left end opening of the inner shaft 43 to the vicinity of the second clutch 51b. Into the right hollow portion 114, left side portions of the pipes 111, 112, 113 are inserted from a right end opening of the right hollow portion 114.

A left side outer circumference of the first pipe 111 is oil-tightly held on a left side inner circumference of the right hollow portion 114 via a seal member 111a. A left side outer circumference of the second pipe 112 is oil-tightly held on an inner circumference of the middle portion of the right hollow portion 114 via a seal member 112a. A left side outer circumference of the third pipe 113 is oil-tightly held on a right side inner circumference of the right hollow portion 114 via a seal member 113a.

The right end portions of the pipes 111, 112, 113 are oil-tightly inserted through their respective annular holders 111b, 112b, 113b and held there. At each of the right end portions of the pipes 111, 112, 113, there is formed a flange. The right end portion of the first pipe 111 is supported with its flange sandwiched between the holder 111b and the right outside wall 69a of the clutch cover 69. The right end portion of the second pipe 112 is supported with its flange sandwiched between the holder 111b and a holder 112b. The right end portion of the third pipe 113 is supported with its flange sandwiched between the holder 112b and a holder 113b. The holder 113b through which the third pipe 113 extends is fixed on the right outside wall 69a of the clutch cover 69 from inside with a bolt. Thereby, the holders 111b, 112b, 113b and the pipes 111, 112, 113 are fixed on the clutch cover 69, A space in the first pipe 111 and annular spaces formed between the pipes 111, 112, 113 form a plurality of in-shaft oil passages 115, 116, 117 that are coaxially laid on top of each other in the main shaft 28.

To be more specific, the space in the first pipe 111 functions as a first in-shaft oil passage 115. A right end portion thereof is in communication with the first oil supply passage 92a that is connected to a center position of the clutch of the clutch cover 69. A left end portion thereof is in communication with the connection side oil pressure chamber 54b of the second clutch 51b via the connection side oil passage 115a that extends through the inner and outer shafts 43, 44 and the clutch center 57b in a substantially radial direction of the clutch.

The space between the first pipe 111 and the second pipe 112 functions as a second in-shaft oil passage 116. A right end portion thereof is in communication with an in-cover main oil supply passage 71a formed in the interior of the clutch cover 69. A left end portion thereof is in communication with the disconnection side oil pressure chamber 55a of the first clutch 51a via a disconnection side oil passage 116a that extends through the inner shaft 43 and the clutch center 57a in a substantially radial direction of the clutch. To the in-cover main oil supply passage 71a, an oil pressure from the first oil pump 31 is supplied.

The space between the second pipe 112 and the third pipe 113 functions as a third in-shaft oil passage 117. A right end portion thereof is in communication with the second oil supply passage 92b connected to a position offset from the center of a clutch of the clutch cover 69. A left end portion thereof is in communication with the connection side oil pressure chamber 54a of the first clutch 51a via a connection side oil passage 117a that extends through the inner shaft 43 and the clutch center 57a in a substantially radial direction of the clutch.

Furthermore, the main oil supply passage 71 in the inner shaft 43 has its right end portion in communication with the disconnection side oil pressure chamber 55b of the second clutch 51b via the disconnection side oil passage 118a that extends through the inner and outer shafts 43, 44 and the clutch center 57b in a substantially radial direction of the clutch.

Here, in the in-shaft oil passages 115, 116, 117 on the right side of the inner shaft 43, it is configured such that a capacity (cross-sectional area) of the second in-shaft oil passage 116 on which an oil pressure with a comparatively low pressure is applied is smaller than capacities of the other in-shaft oil passages 115, 117 on which an oil pressure with a comparatively high pressure is applied. Similarly, it is configured such that capacities of the disconnection side oil passages 116a, 118a are smaller than the capacities of the connection side oil passages 115a, 117a.

Figure 10:
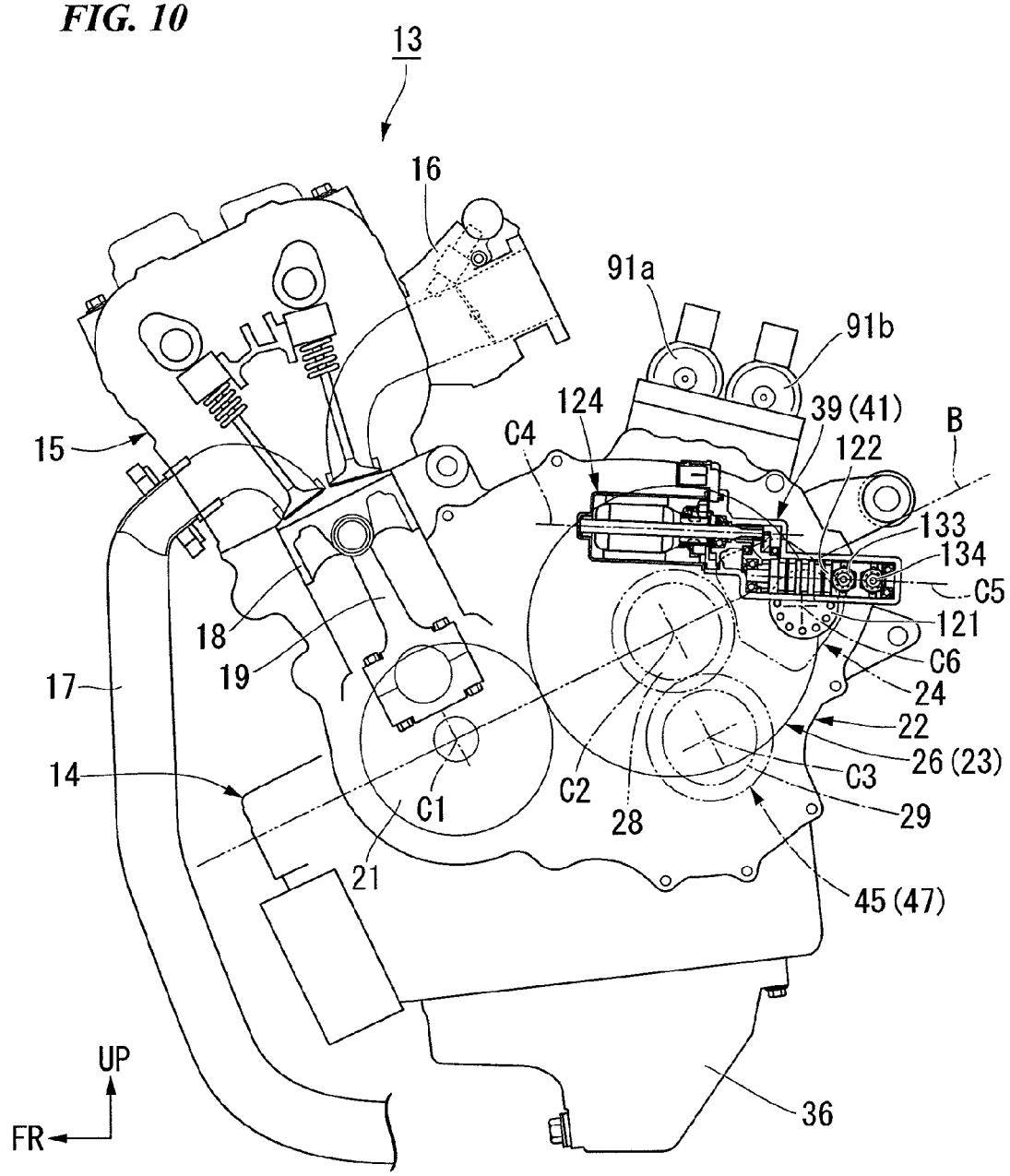
FIG. 10 is a left side view of the engine.

As shown in FIG. 10, on an upper left side of the transmission case 22 of the engine 13, the drive mechanism 39 of the gear shift device 41 is disposed.

Figure 11A:
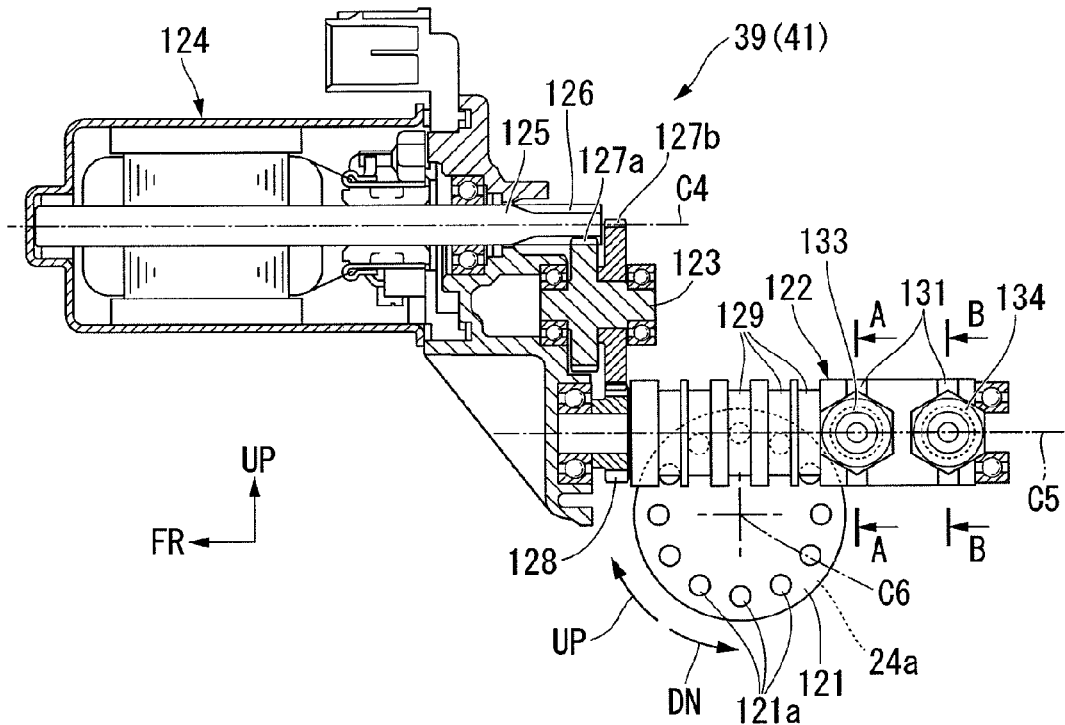
FIG. 11A is a cross-sectional view showing a gear shift device of the engine.
Figure 11B:
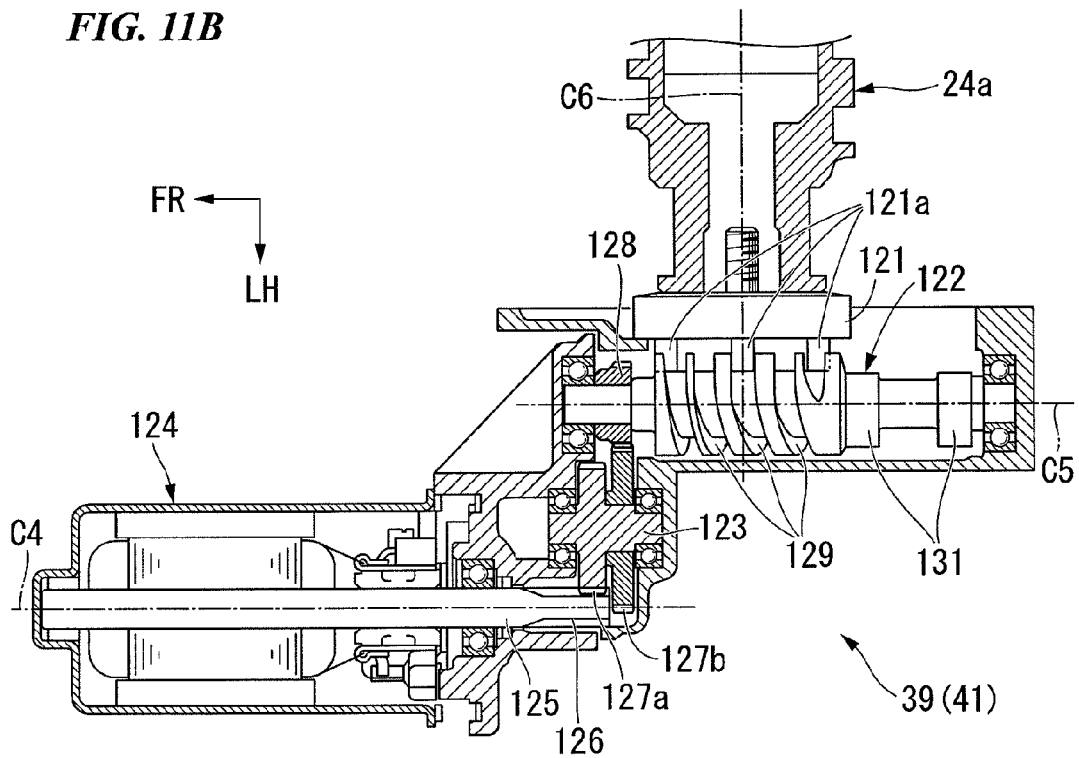
FIG. 11B is a cross-sectional view showing the gear shift device of the engine.

With additional reference to FIG. 11A and FIG. 11B, the drive mechanism 39 has: a pin gear 121 coaxially fixed to a left end portion of the shift drum 24a of the change mechanism 24; a worm-shaped barrel cam 122 that meshes with the pin gear 121; and an electric motor 124 that imparts a rotational drive force to the barrel cam 122 via a relay gear shaft 123. The drive mechanism 39 rotates the shift drum 24a through drive of the electric motor 124, to thereby shift the transmission gears of the transmission 47.

The electric motor 124 is arranged so that its rotational drive axis line C4 is oriented along the front-rear direction, and its drive shaft 125 is protruded rearward. On the circumference of the tip portion of the drive shaft 125, there is formed a drive gear 126. The drive gear 126 meshes with a first relay gear 127a of the relay gear shaft 123. A second relay gear 127b of the relay gear shaft 123 meshes with a follower gear 128 at a front end portion of the barrel cam 122. The barrel cam 122 has a rotational axis line C5 that is parallel to the axis line C4 of the electric motor 124. In the front outer circumference of the barrel cam 122, there are formed a plurality of cam grooves 129. The cam grooves 129 continue into each other so as to be a substantially single (or plural) thread groove(s). Some of a plurality of pins 121a protrudingly provided on the pin gear 121 mesh with the cam grooves 129.

On a left side of the disk-shaped main body of the pin gear 121, the plurality of pins 121a evenly spaced in a circumferential direction are protruded in a manner parallel to the shift drum 24a. The rotation axis line C5 of the barrel cam 122 is arranged perpendicularly to a rotation axis line C6 oriented along a left-right direction of the pin gear 121 (shift drum 24a). An upper portion of the pin gear 121 overlaps a front portion of the barrel cam 122 when seen in a side view. The pins 121a positioned at the upper portion of the pin gear 121 respectively mesh with the cam grooves 129 in the front outer circumference of the barrel cam 122. Note that as for the cam grooves 129 and the pins 121a, it is permissible that at least one pair is in mesh.

Through control by the ECU 42, the electric motor 124 is driven. When the barrel cam 122 is rotated in a normal rotation direction (in a direction of an arrow CW in FIG. 12A and FIG. 12B) by one rotation, the cam grooves 129 is displaced rearward by one row (by one pitch) in a direction in which they are placed side by side (in the front-rear direction), to thereby rotate the pin gear 121 and the shift drum 24a in an upshifting direction (in a direction of an arrow UP in FIG. 11A) by an angle corresponding to the one pitch. The rotation angle of the shift drum 24a at this time corresponds to an angle that upshifts a transmission gear of the transmission 47 by one gear.

Similarly, when the electric motor 124 is driven and the barrel cam 122 is rotated in a reverse rotation direction (in a direction of an arrow CCW in FIG. 12A and FIG. 12B) by one rotation, the cam grooves 129 is displaced forward by one pitch, to thereby rotate the pin gear 121 and the shift drum 24a in a downshifting direction (in a direction of an arrow DN in FIG. 11A) by an angle corresponding to the one pitch. The rotation angle of the shift drum 24a at this time corresponds to an angle that downshifts a transmission gear of the transmission 47 by one gear.

Here, the transmission 47 can be set in a state that allows for a force transfer both in a current shift position (shift position in which an actual force transfer is performed via the twin clutch 26) and in a shift position on a side upshifted or downshifted by one gear from the current shift position (shift position in which a force transfer is cut off via the twin clutch 26) (that is, in shift positions in even-numbered gears and in odd-numbered gears, respectively).

In the transmission 47 like this, when the upshifting by one gear is performed, a state allowing for a force transfer is produced both in the current shift position and in a shift position on a side upshifted by one gear. When the downshifting by one gear is performed, a state allowing for a force transfer is produced both in the current shift position and in a shift position on a side downshifted by one gear. Then, according to which mesh state the twin clutch 26 takes, the transmission 47 switches shift positions for use in performing an actual force transfer.

Figure 13A:
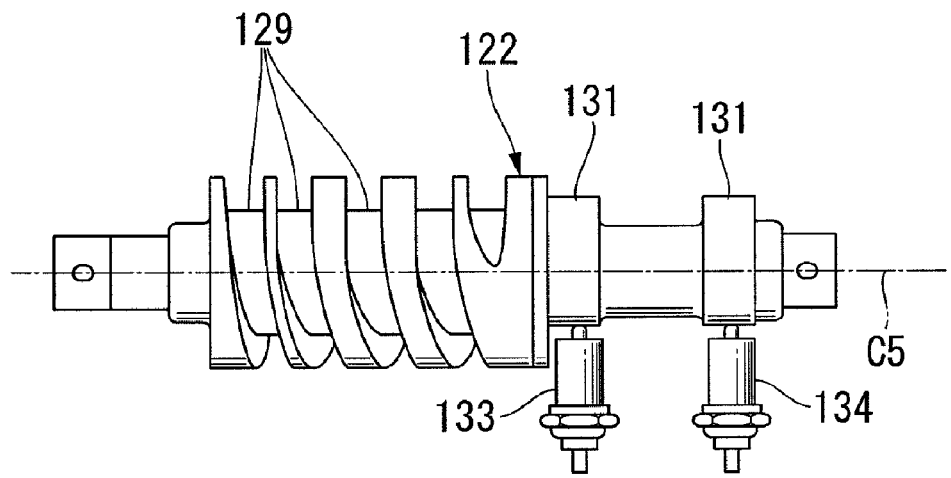
FIG. 13A is a side view showing a barrel cam of the gear shift device.
Figure 13B:
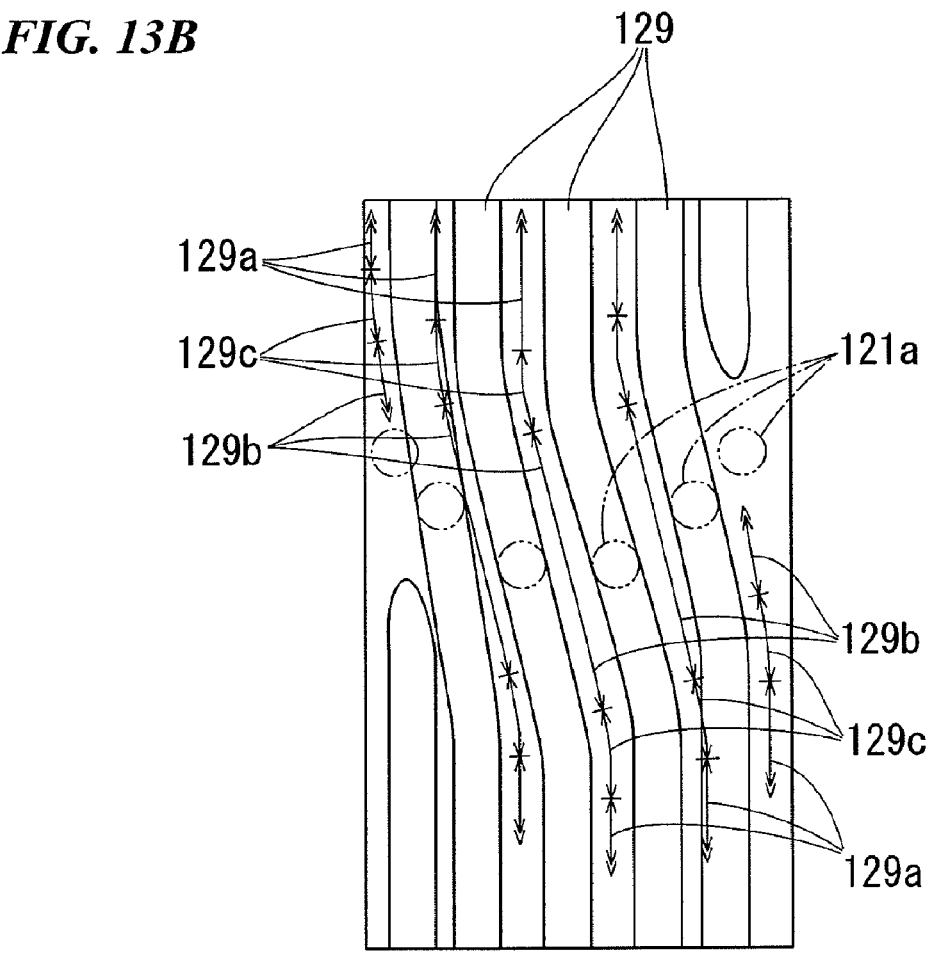
FIG. 13B is a net of cam grooves in an outer circumference of the barrel cam of the gear shift device.

As shown in FIG. 13B, each of the cam grooves 129 includes: a retention region 129a in which a position in a barrel cam axis direction (direction in which the cam grooves 129 are placed side by side) is held constant; and a change region 129b in which a position in the barrel cam axis direction is mildly changed. In a state where the pins 121a mesh with the retention regions 129a of the cam grooves 129, the pin gear 121 and the shift drum 24a do not rotate even if the barrel cam 122 rotates. In a state where the pins 121a mesh with the change regions 129b of the cam grooves 129, the pin gear 121 and the shift drum 24a rotates in the upshifting direction or in the downshifting direction according to the rotation of the barrel cam 122.

The retention region 129a and the change region 129b in each of the cam grooves 129 smoothly continue into each other via a curved portion 129c. The curved portion 129c in each of the cam grooves 129 is arranged in an arc shape so as to be oriented along a circumferential direction of the pin gear 121 (direction in which the cam grooves 129 are placed side by side). As a result, when the barrel cam 122 rotates the pin gear 121, the pins 121a go into either ones of the retention regions 129a and the change regions 129b from the other ones in the cam grooves 129 smoothly and simultaneously. This makes the rotation of the shift drum 24a gentle and smooth, and also lessens load on the pins 121a and the cam grooves 129.

Figure 12A:
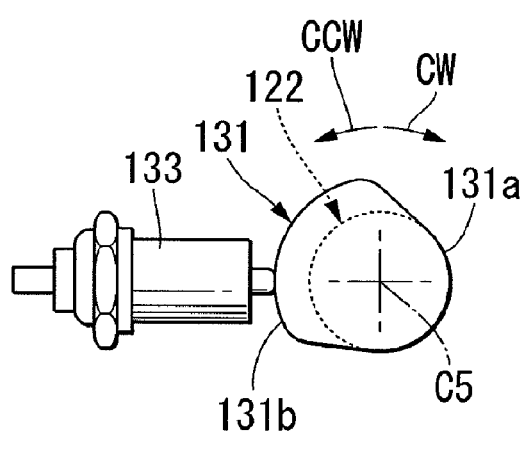
FIG. 12A is a cross-sectional view of FIG. 11A taken along the line A-A.
Figure 12B:
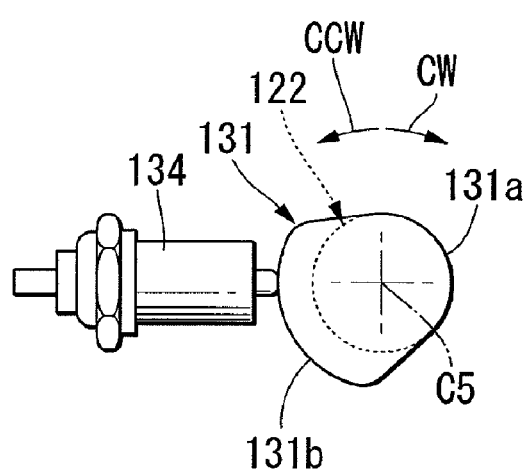
FIG. 12B is a cross-sectional view of FIG. 11A taken along the line B-B.

As shown in FIG. 11A, FIG. 12A, and FIG. 12B, on a rear outer circumference of the barrel cam 122, there are provided two switch cams 131 aligned in the front-rear direction. Furthermore, for example, to the left of the switch cams 131, there are provided first and second switches 133, 134 with their switch pieces opposed to an abutting surface of the corresponding switch cam 131. The switch cams 131 and the sensors 133, 134 constitute the sensor S1 that detects the rotational position of the barrel cam 122.

The switch cams 131 are of substantially the same shape when seen in the barrel cam axis direction. They have an abutting surface formed on their outer circumferences. Each of the abutting surfaces of the switch cams 131 has: a reference surface 131a with a cylindrical shape coaxial with the barrel cam 122; and a lifting surface 131b with a cylindrical shape whose diameter is larger than that of the reference surface 131a. The two surfaces smoothly continue into each other. The switch cams 131 are arranged so that formation regions for the lifting surfaces have a predetermined phase difference from each other in a barrel cam rotation direction. To be more specific, the switch cam 131 for the second switch 134 is arranged with a phase difference in the CCW direction by a predetermined angle with respect to the switch cam 131 for the first switch 133.

The switches 133, 134 move their switch pieces forward and backward when the switch pieces are opposed to the reference surfaces 131a of the switch cams 131 (when the switches 133, 134 are in the OFF position) and when the switch pieces are opposed to the lifting surfaces 131b of the switch cams 131 (when the switches 133, 134 are in the ON position). Thereby, the switches 133, 134 detect the rotational state of the barrel cam 122. The switches 133, 134 are arranged so that the phases of the switches 133, 134 in the barrel cam rotation direction are the same as each other.

Figure 14:
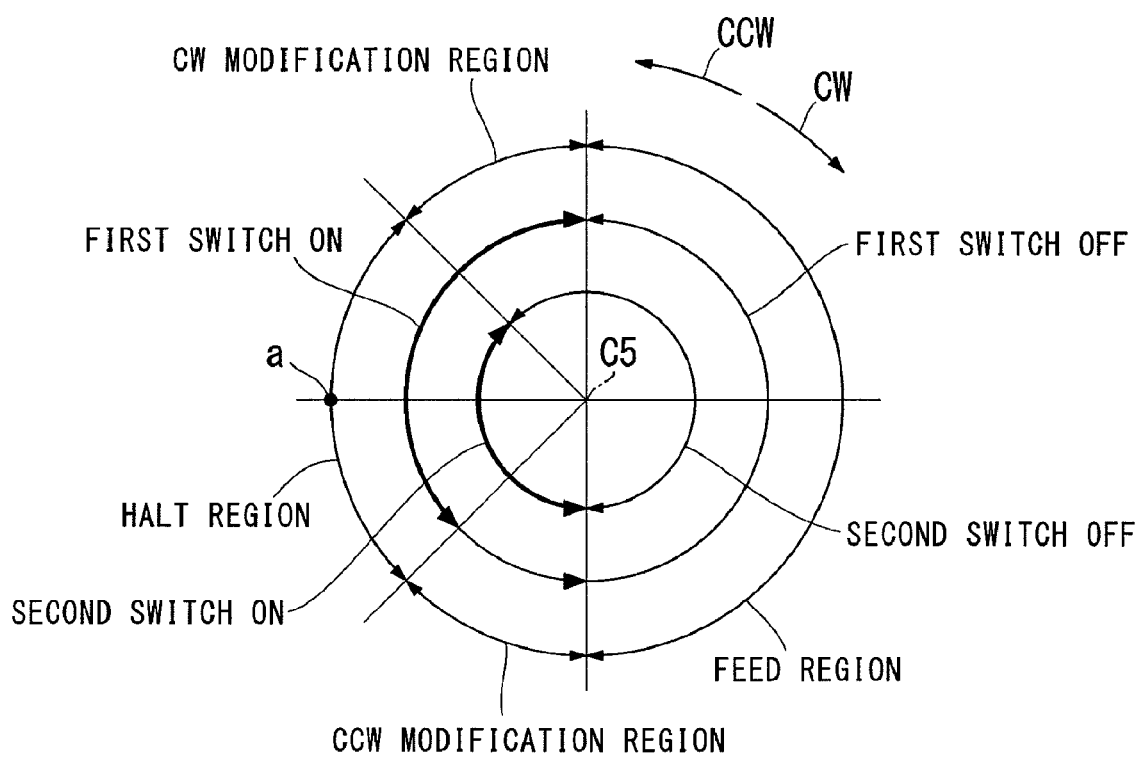
FIG. 14 is a diagram showing ONs and OFFs of a first switch and a second switch with respect to rotation angles of the barrel cams.

FIG. 14 is a diagram showing the ON and OFF positions of the switches 133, 134 with respect to the rotation angles of the barrel cam 122. The region in which the lifting surfaces 131b of the switch cams 131 are opposed to a point a that is a detection position of the switches 133, 134 (region in which the switches 133, 134 are in ON position) is a halt region in which the pins 121a of the pin gear 121 are in the retention regions 129a of the cam grooves 129 of the barrel cam 122 and in which a drive torque of the electric motor 124 is 0 (see FIG. 15A and FIG. 15B).

In this condition, adjustments are made so that the transmission 47 is in a state of completion of a transmission operation. Thereby, a little displacement of the rotation position of the barrel cam 122 does not influence the shift position. In addition, even if the drive torque of the electric motor 124 is 0, the rotation of the shift drum 24a is restricted to be held in a predetermined shift position. Note that the angle of the halt region is set to an angle or greater at which the barrel cam 122 rotates through inertia or the like when the drive torque of the electric motor 124 is 0.

Figures 15A, 15B, 16:
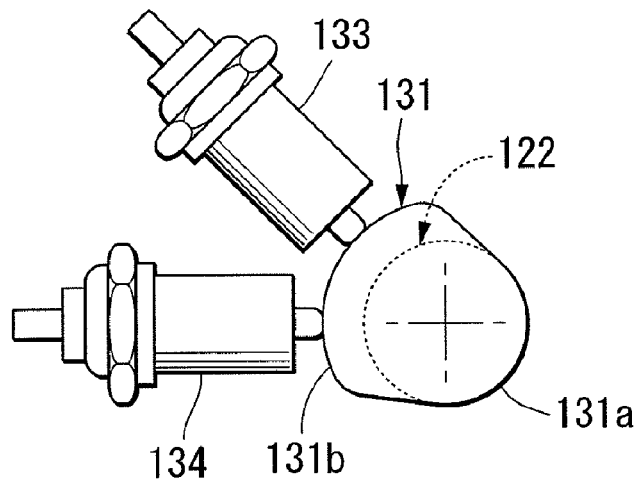
FIG. 15A is a table showing ONs and OFFs of switches with respect to rotation regions of the barrel cams.
FIG. 15B is a table showing torques of a motor for driving the barrel cams with respect to the rotation regions of the barrel cams.
FIG. 16 shows a modification of arrangement of the first and second sensors. It is a cross-sectional view corresponding to FIG. 12A and FIG. 12B.

On the other hand, a region in which the reference surfaces 131a of the switch cams 131 are opposed to the point a (region in which the respective switches 133, 134 are in OFF position) is a feed region in which the pins 121a of the pin gear 121 are in the change regions 129b of the cam grooves 129 of the barrel cam 122 and in which the electric motor 124 is driven with a normal torque (maximum torque±Tmax set by a system) (see FIG. 15A and FIG. 15B).

At this time, the transmission 47 is in the middle of a transmission operation. According to the rotation of the barrel cam 122, the shift drum 24a rotates in the upshifting direction or in the downshifting direction. Note that the angle of the feed region corresponds to an angle for forming the change regions 129b of the cam grooves 129 in the barrel cam 122.

The regions in which the lifting surface 131b of one of the switch cams 131 is opposed to the point a (region in which one of the switches 133, 134 is in ON position) is a CW or CCW modification region in which the pins 121a of the pin gear 121 is the vicinity of end portions the retention regions 129a of the cam grooves 129 of the barrel cam 122 and in which the electric motor 124 is driven with a small torque (minimum torque±Tmin that overcomes a friction of the system) (see FIG. 15A and FIG. 15B).

To be more specific, in the CCW modification region in which only the second switch 134 whose phase is displaced in the CCW direction of the barrel cam 122 is in ON position, the electric motor 124 is driven with a minimum reverse torque (−Tmin) to rotate the barrel cam 122 in the CCW direction with a low torque, to thereby make a correction such that the switch cams 131 are in the halt region. Furthermore, in the CW modification region in which only the first switch 133 whose phase is displaced in the CW direction of the barrel cam 122 is in ON position, the electric motor 124 is driven with a minimum normal torque (+Tmin) to rotate the barrel cam 122 in the CW direction with a low torque, to thereby make a correction such that the switch cams 131 are similarly in the halt region.

As shown in FIG. 16, the single switch cam 131 may be provided on the barrel cam 122, and the two switches 133, 134 may be opposed to the abutting surface of the switch cam 131 with a phase difference in the rotation direction of the barrel cam. Thereby, it is possible to offer a similar control while reducing the number of switch cams. Furthermore, the switches 133, 134 are not limited to ones of a mechanical contact type, but also includes switches using electricity or a magnetic force, or switches of a non-contact type may be used.

Figure 17A:
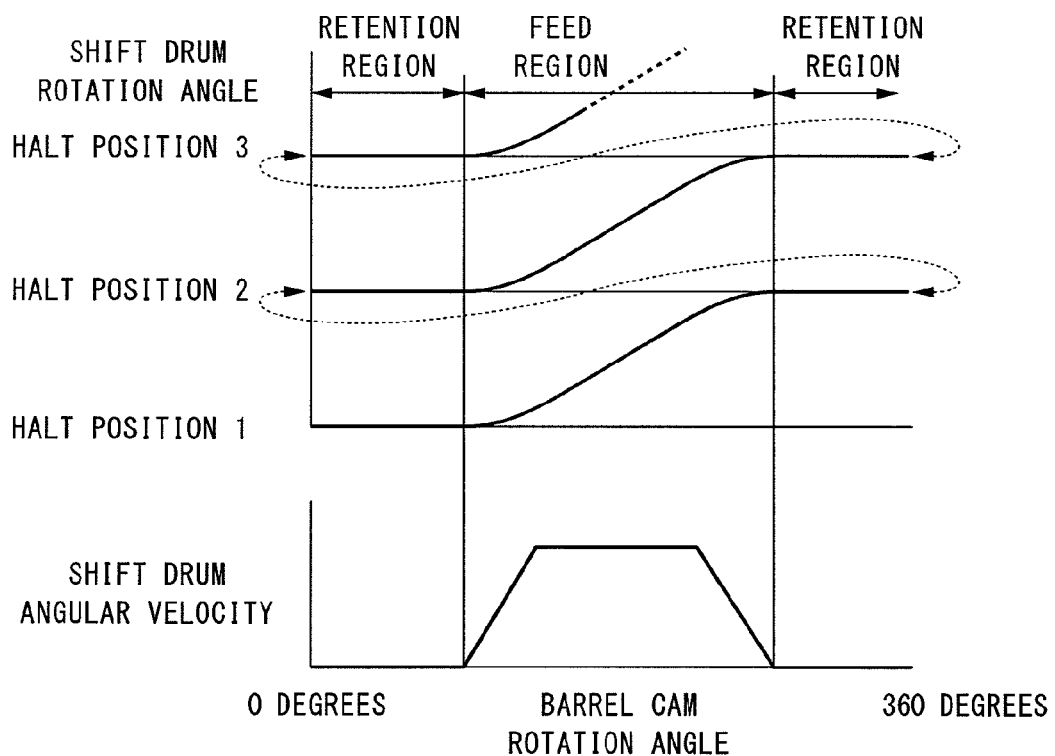
FIG. 17A is a graph showing rotation angles and angular velocities of a shift drum with respect to barrel cam rotation angles of the gear shift device. It shows a case where the cam grooves are continuous via a curved portion.
Figure 17B:
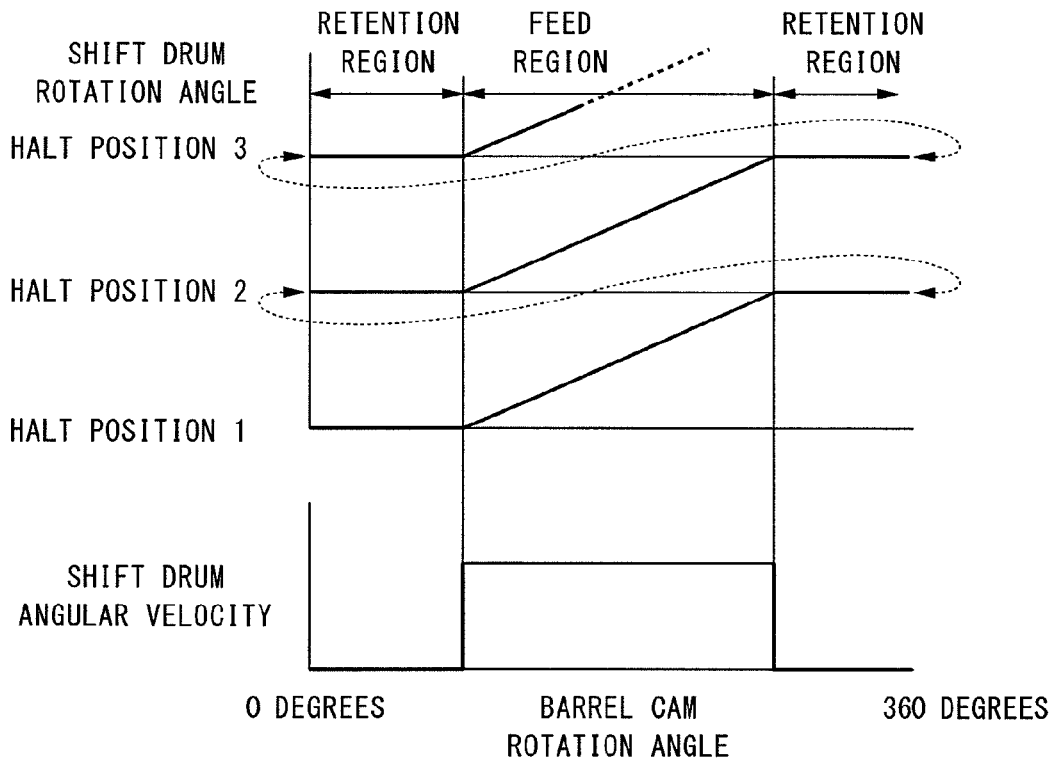
FIG. 17B is a graph showing rotation angles and angular velocities of a shift drum with respect to barrel cam rotation angles of the gear shift device. It shows a case where the cam grooves are continuous not via a curved portion.

FIG. 17A and FIG. 17B are graphs showing a change in rotation angle and rotational angular velocity of the shift drum 24a with respect to the rotation angles of the barrel cam 122. In the case where the regions 129a, 129b of the cam grooves 129 of the barrel cam 122 smoothly continue into each other via the curved portion 129c (see FIG. 17A) as in this embodiment, a change in rotation angle of the shift drum 24a is smooth and also a rise in rotational angular velocity of the shift drum 24a before and after the change region 129b is smooth compared with the case where the cam grooves 129 continue into each other as if bending their ways between the regions 129a, 129b not via the curved portion 129c (see FIG. 17B).

As a result, the inertia torque of the shift drum 24a at the time of upshifting and downshifting is suppressed, and hence load on each of the mechanism parts is suppressed. After completion of one rotation of the barrel cam 122, that rotation position is an initial position in the shift position on the side to which the transmission is upshifted or downshifted by one gear. From this state, it is possible to perform a successive transmission operation.

As described above, the twin-clutch apparatus of the above embodiment is for use in a twin-clutch transmission 23 of an engine 13, including: hydraulic first and second disk clutches 51a, 51b that exert a predetermined engagement force by pressure plates 52a, 52d displaced in an axial direction by the pressure of supply oil from outside, the first and second disk clutches 51a, 51b being arranged adjacent to each other, in which clutch plates 61a, 61b of the respective disk clutches 51a, 51b are different in thickness from each other.

According to this configuration, while the clutch plates of the disk clutches 51a, 51b are made equal in diameter, it is possible to make the clutch capacities different, and to maintain the whole clutch compact. Furthermore, only a modification of the clutch plate thicknesses allows for easy optimization of the clutch capacity.

Furthermore, in the above twin-clutch apparatus, a first disk clutch 51a in which a comparatively thick clutch plates 61a are employed is coupled to a first gear (start gear, transmission gear pair 45a) of the twin-clutch transmission 23. Thereby, it is possible to secure the capacity of the first disk clutch 51a, to which the first gear requiring a heavier load at the start or the like is coupled, more than that of the other second disk clutch 51b. Therefore, it is possible to actualize a twin-clutch transmission 23 that is compact and has a favorable efficiency.

Furthermore, in the above twin-clutch apparatus, a first disk clutch 51a in which comparatively thick clutch plates 61a are employed is arranged in the vicinity of a right outside wall 69a of a clutch case 25. Thereby, it is possible to arrange the first disk clutch 51a that produces a lot of heat after being coupled to the first gear near an outer wall of a clutch case, that is, at a position that is likely to dissipate heat.

Furthermore, in the above twin-clutch apparatus, a damper member 59 for absorbing a shock at the time of a force transfer is provided on a clutch center 57a of the first disk clutch 61a. Thereby, it is possible to absorb a shock at the time of a connection/disconnection operation of the first disk clutch 51a, thus allowing for a smooth transmission operation. Especially because the damper member 59 is provided on the first disk clutch 61a to which the first gear is coupled, it is possible to make the start of the two-wheeled motor vehicle 1 smoother.

The present invention is not limited to the above embodiment, but is applicable to various types of internal combustion engines such as a single cylinder engine, a V engine, and a longitudinal engine in which the crank axis line is oriented along the front-rear direction. Furthermore, the present invention may be applied not only to two-wheeled motor vehicles, but also to saddle mounting type motor vehicles with three- or four-wheels or to scooter type motor vehicles with a low floorboard.

The configuration in the above embodiment is one example of the present invention. Obviously, the present invention is applicable also to four-wheeled passenger cars. In addition, obviously, various modifications can be made as long as they do not depart from the spirit or scope of this invention.

INDUSTRIAL APPLICABILITY

According to the present invention, it is possible to provide a twin-clutch apparatus whose clutch capacity is optimized while the whole clutch remains compact.

The invention claimed is:

1. A twin-clutch apparatus for use in a transmission of an engine, comprising a hydraulic first disk clutch and second disk clutch that exert a predetermined engagement force by pressure members displaced in an axial direction by the pressure of a supply oil from outside, the first disk clutch and the second disk clutch being coaxially arranged adjacent to each other in the axial direction, wherein:
   clutch plates of the first disk clutch and clutch plates of the second disk clutch are different in thickness from each other; and
   the clutch plates of the first disk clutch and the clutch plates of the second disk clutch are equal in diameter.

2. The twin-clutch apparatus according to claim 1, the first disk clutch and the second disk clutch share a single clutch outer, and
   the first disk clutch is coupled to a first speed gear of the transmission.

3. The twin-clutch apparatus according to claim 2, wherein the clutch outer has a cylindrical shape with one closed end and one open end, further comprising:
   a clutch center for the first disk clutch arranged in an interior of the cylindrically-shaped clutch outer in a position adjacent to the closed end,
   a clutch center for the second clutch arranged in the interior of the cylindrically-shaped clutch outer in a position adjacent to the open end, and
   a shock absorber member for absorbing a shock at the time of a force transfer provided on the clutch center of at least one of the first disk clutch and the second disk clutch.

4. The twin-clutch apparatus according to claim 2, wherein the clutch outer has a cylindrical shape with one closed end and one open end, further comprising:
   a clutch center for the first disk clutch arranged in an interior of the cylindrically-shaped clutch outer in a position adjacent to the closed end,
   a clutch center for the second clutch arranged in the interior of the cylindrically-shaped clutch outer in a position adjacent to the open end, and
   a shock absorber member for absorbing a shock at the time of a force transfer provided on the clutch center of the first disk clutch.

5. The twin-clutch apparatus according to claim 3, wherein the damper member is formed of elastic material and is provided on the clutch center of the first disk clutch.

6. The twin-clutch apparatus according to claim 1, wherein the first disk clutch is arranged in a vicinity of an outer wall of a clutch case.

7. The twin-clutch apparatus according to claim 1, the first and second disk clutches, and are spaced apart from each other in the axial direction.

8. A twin-clutch apparatus for use in a transmission of an engine, comprising:
   a hydraulic first disk clutch and second disk clutch that exert a predetermined engagement force by pressure members displaced in an axial direction by the pressure of a supply oil from outside, the first disk clutch and the second disk clutch being coaxially arranged adjacent to each other in the axial direction, wherein:
   clutch plates of the first disk clutch and clutch plates of the second disk clutch are different in thickness from each other; and
   the clutch plates of the first disk clutch and the clutch plates of the second disk clutch are equal in diameter,
   wherein a shock absorber member for absorbing a shock at the time of a force transfer is provided on a clutch center of at least one of the first disk clutch and the second disk clutch.

9. The twin-clutch apparatus according to claim 8, wherein the shock absorber member for absorbing the shock at the time of the force transfer is provided only on the clutch center of the first disk clutch,
   wherein the clutch center of the first disk clutch is arranged inside a clutch outer which opens toward an outer wall of a clutch case.

10. The twin-clutch apparatus according to claim 8, wherein the first disk clutch is coupled to a first speed gear of the transmission.

11. The twin-clutch apparatus according to claim 8, the first and second disk clutches are disposed inside a single clutch outer, and are spaced apart from each other in the axial direction.

12. The twin-clutch apparatus according to claim 8, wherein the damper member is formed of elastic material and is provided on the clutch center of the first disk clutch.

* * * * *